US011197542B2

(12) United States Patent
Haimoff

(10) Patent No.: US 11,197,542 B2
(45) Date of Patent: Dec. 14, 2021

(54) COUPLING SYSTEM AND CONSTRUCTION INCLUDING SAME

(71) Applicants: Huliot Storage Solutions Ltd., Rosh Haayin (IL); Graduate Plastics Inc., Miami, FL (US)

(72) Inventor: Efraim Haimoff, Mevaseret Zion (IL)

(73) Assignees: HULOIT STORAGE SOLUTIONS LTD., Rosh Haayin (IL); GRADUATE PLASTICS INC., Miami, FL (US)

( * ) Notice: Subject to any disclaimer, the term of this patent is extended or adjusted under 35 U.S.C. 154(b) by 0 days.

(21) Appl. No.: 16/801,941

(22) Filed: Feb. 26, 2020

(65) Prior Publication Data

US 2021/0259408 A1    Aug. 26, 2021

(51) Int. Cl.
  *A47B 47/00* (2006.01)
  *A47B 96/14* (2006.01)
  *F16B 7/04* (2006.01)

(52) U.S. Cl.
  CPC ........ *A47B 47/0008* (2013.01); *A47B 47/005* (2013.01); *A47B 47/0058* (2013.01);
  (Continued)

(58) Field of Classification Search
  CPC ............ A47B 47/0008; A47B 47/0058; A47B 47/0083; A47B 47/0091; A47B 96/1441; A47B 47/0016; A47B 47/0033; A47B 47/0041; A47B 47/005; A47B 2096/1491; A47B 2230/0077; A47B 2230/0081; A47B 2230/07; A47B 2230/13; F16B 12/00; F16B 7/044; F16B 7/0446; F16B 7/0453; F16B 7/046; F16B 7/0466; F16B 7/0473;
  (Continued)

(56) References Cited

U.S. PATENT DOCUMENTS 2,820,551 A * 1/1958 Mount ................. A47B 47/024
  108/107
3,451,183 A * 6/1969 Lespagnol .............. E04C 3/065
  52/656.1
(Continued)

FOREIGN PATENT DOCUMENTS

CN     2649927 Y    10/2004
CN     2650609 Y    10/2004
(Continued)

*Primary Examiner* — Jennifer E. Novosad
(74) *Attorney, Agent, or Firm* — Dorsey & Whitney LLP

(57) ABSTRACT

A present application is directed to a shelving system having a coupling system comprising a tab coupler and a socket coupler, said tab coupler comprising a locking tab extending from a locking face along a locking axis and configured with a round, T-like sectioned shape; said socket coupler comprising a U-shaped locking socket projecting from a mounting face of the socket coupler along a coupler axis and configured with a U-shaped tab arresting groove; the coupling system is configurable between an unlocked position whereat the locking socket slidingly receives the locking tab so that the locking axis and the coupler axis coincide, and a locked position upon rotating one of the tab coupler and the socket coupler about the coinciding axes, entailing snugly arresting of the locking tab by the locking socket, preventing sliding displacement and axial displacement along the coinciding axes.

31 Claims, 33 Drawing Sheets

(52) U.S. Cl.
CPC ...... *A47B 47/0083* (2013.01); *A47B 47/0091* (2013.01); *A47B 96/1441* (2013.01); *A47B 2230/07* (2013.01); *A47B 2230/13* (2013.01); *F16B 7/0473* (2013.01)

(58) Field of Classification Search
CPC .. F16B 9/052; F16B 9/09; F16B 12/38; F16B 12/40; F16B 12/50; Y10T 403/7094; Y10T 403/7005
USPC ........ 211/186, 191, 192, 187, 182; 403/381, 403/348
See application file for complete search history.

(56) References Cited

U.S. PATENT DOCUMENTS

| | | | | |
|---|---|---|---|---|
| 3,672,710 A | * | 6/1972 | Kroopp | E04B 1/5831 403/252 |
| 3,749,432 A | * | 7/1973 | Janssen | E04B 2/766 52/476 |
| 3,945,742 A | * | 3/1976 | Condevaux | F16B 12/32 403/255 |
| 4,049,230 A | * | 9/1977 | Minniear | H01Q 1/1221 248/539 |
| 4,079,678 A | * | 3/1978 | Champagne | A47B 57/545 108/106 |
| 4,128,064 A | * | 12/1978 | Chung | A47B 57/265 108/147.13 |
| 4,142,809 A | * | 3/1979 | Shell | F16B 9/056 403/201 |
| 4,510,355 A | * | 4/1985 | Atsumi | H01H 21/285 200/47 |
| 4,572,694 A | * | 2/1986 | Hoeksema | F16B 7/0473 403/187 |
| 4,712,286 A | * | 12/1987 | Wolf | A47B 57/40 138/160 |
| 4,929,116 A | * | 5/1990 | Mahl | A47B 43/02 403/263 |
| 4,996,929 A | * | 3/1991 | Saal | A47B 47/021 108/107 |
| 5,048,995 A | * | 9/1991 | Beaulieu | F16B 7/0473 403/264 |
| 5,052,565 A | * | 10/1991 | Zachrei | F16B 7/0446 211/182 |
| 5,154,385 A | * | 10/1992 | Lindberg | A47B 57/562 248/225.11 |
| 5,174,200 A | * | 12/1992 | Jeandel | A47B 47/024 108/107 |
| 5,285,613 A | * | 2/1994 | Goldsworthy | E04H 12/02 52/648.1 |
| 5,607,250 A | | 3/1997 | Tatterson et al. | |
| 5,626,435 A | * | 5/1997 | Wohlhuter | B60D 1/52 280/416.1 |
| 5,683,197 A | * | 11/1997 | Pihl | F16B 7/0466 403/170 |
| 5,695,081 A | | 12/1997 | Alkalay | |
| 6,059,322 A | * | 5/2000 | Nagai | F16B 7/046 285/125.1 |
| 6,227,756 B1 | * | 5/2001 | Dube | A47B 57/54 211/175 |
| 6,341,918 B1 | * | 1/2002 | Liindberg | A45F 5/021 24/3.12 |
| 6,422,399 B1 | * | 7/2002 | Castillo | A47B 57/40 211/175 |
| 6,425,563 B1 | * | 7/2002 | Mihailoff | A47B 57/54 211/192 |
| 6,547,088 B1 | * | 4/2003 | Wang | A47B 57/26 211/187 |
| 6,935,711 B1 | * | 8/2005 | Naue | A47B 88/43 312/223.1 |
| 7,086,633 B2 | * | 8/2006 | Welch | A47B 57/265 108/147.13 |
| 7,121,418 B2 | * | 10/2006 | Stier | A47F 5/02 211/206 |
| 7,144,184 B1 | * | 12/2006 | Tsai | F16B 12/32 403/350 |
| 7,325,696 B2 | * | 2/2008 | Matthew | B60R 7/10 211/105.3 |
| 7,568,436 B2 | * | 8/2009 | McAllister | A47B 57/265 108/107 |
| 7,641,297 B2 | * | 1/2010 | Huang | H05K 7/1489 312/334.4 |
| 7,934,607 B2 | * | 5/2011 | Henderson | H05K 7/1489 211/26 |
| 8,042,477 B2 | * | 10/2011 | Lee | A47B 87/007 108/147.12 |
| 8,118,181 B2 | | 2/2012 | Shinozaki | |
| 8,376,156 B2 | | 2/2013 | Jarvis et al. | |
| 8,627,966 B2 | * | 1/2014 | Jarvis | A47B 57/545 211/187 |
| 8,708,169 B1 | * | 4/2014 | Chen | F16B 7/0473 211/189 |
| 9,192,250 B2 | * | 11/2015 | Maurer | A47B 47/0083 |
| 9,468,294 B2 | * | 10/2016 | Fu | A47B 57/34 |
| 10,080,437 B1 | | 9/2018 | Tang | |
| 10,299,588 B1 | | 5/2019 | Lai et al. | |
| 10,368,639 B1 | | 8/2019 | Lai et al. | |
| 10,520,113 B1 | * | 12/2019 | Thompson | F16B 2/06 |
| 2003/0152422 A1 | * | 8/2003 | Popovski | F16B 7/0466 403/255 |
| 2005/0211652 A1 | | 9/2005 | Li | |
| 2009/0194991 A1 | * | 8/2009 | Yang | E04B 1/585 285/31 |
| 2012/0009013 A1 | * | 1/2012 | Evitt | E04B 1/5831 403/349 |
| 2014/0292164 A1 | * | 10/2014 | Kallos | F16B 12/02 312/111 |
| 2017/0122567 A1 | | 5/2017 | Horton | |
| 2018/0078036 A1 | | 3/2018 | Qiang et al. | |
| 2018/0206639 A1 | | 7/2018 | Olson et al. | |
| 2018/0289151 A1 | | 10/2018 | Dahatonde et al. | |

FOREIGN PATENT DOCUMENTS

| | | |
|---|---|---|
| CN | 203255602 U | 10/2013 |
| CN | 207118780 U | 3/2018 |
| CN | 208973132 U | 6/2019 |
| EP | 0703128 A1 | 3/1996 |
| EP | 0983735 B1 | 11/2003 |
| JP | 2017093925 A | 6/2017 |
| WO | 2007014954 A1 | 2/2007 |
| WO | 2011050406 A1 | 5/2011 |
| WO | 2013029088 A1 | 3/2013 |

* cited by examiner

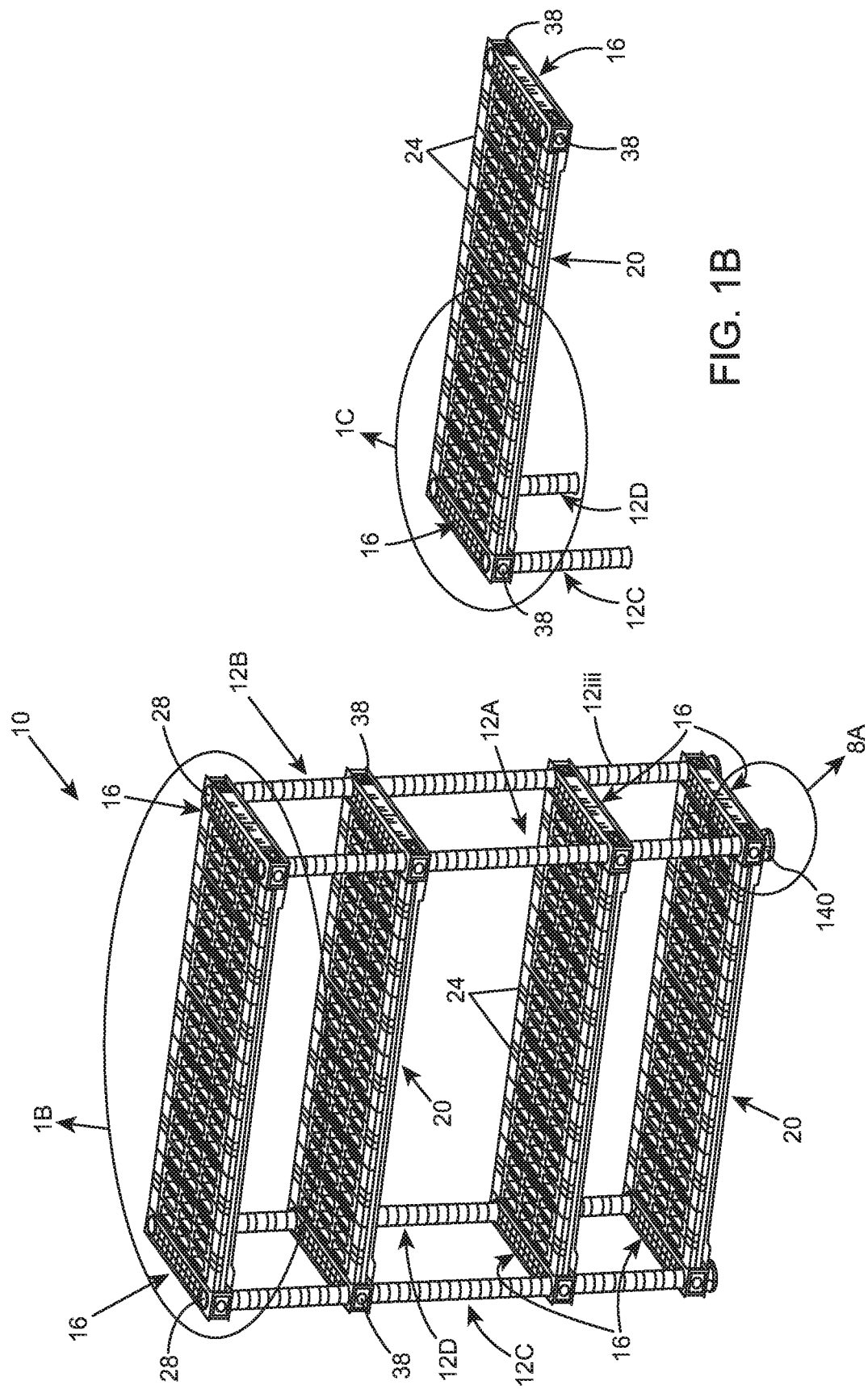

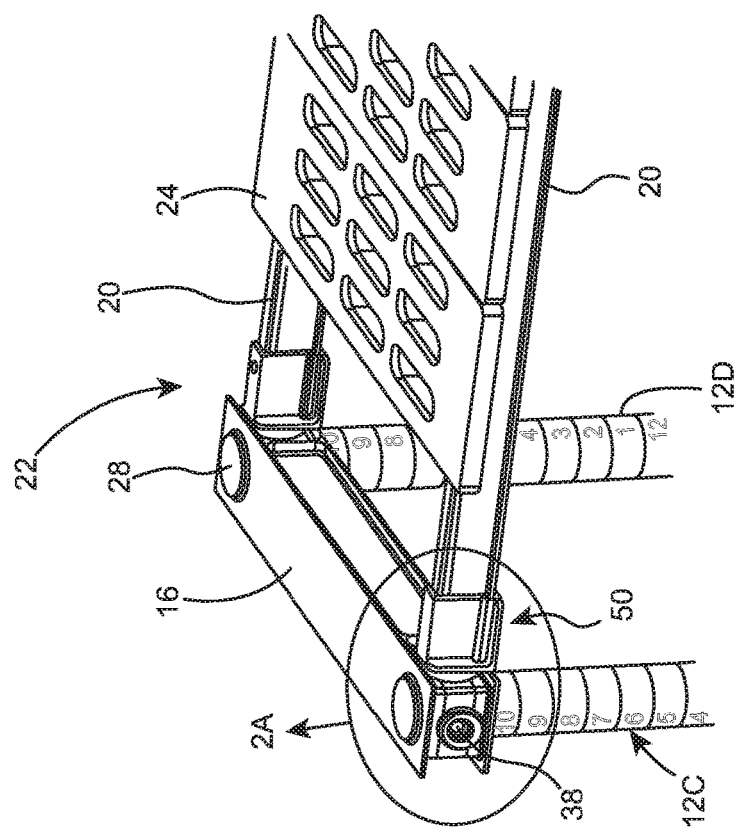
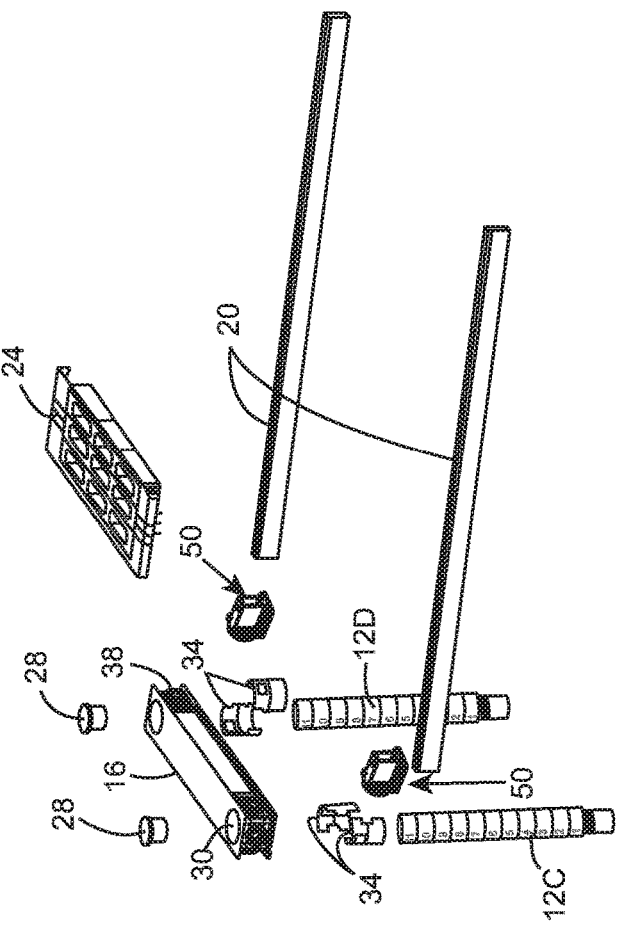
FIG. 1C
FIG. 1D

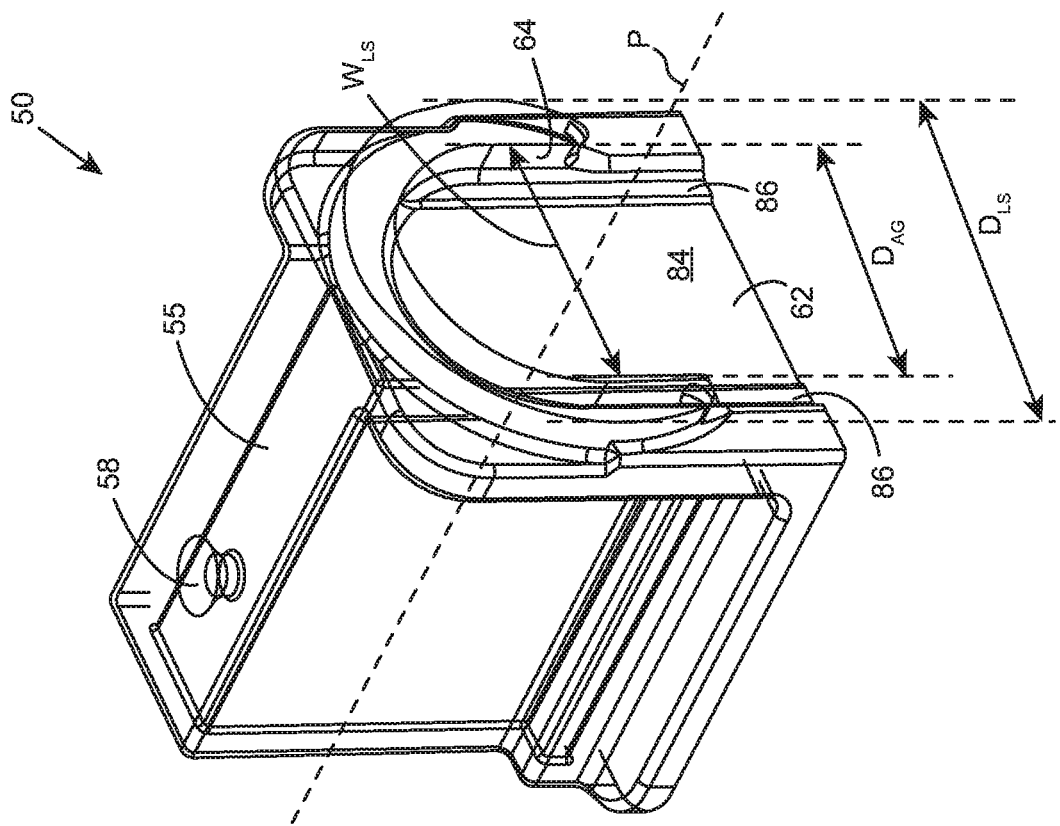
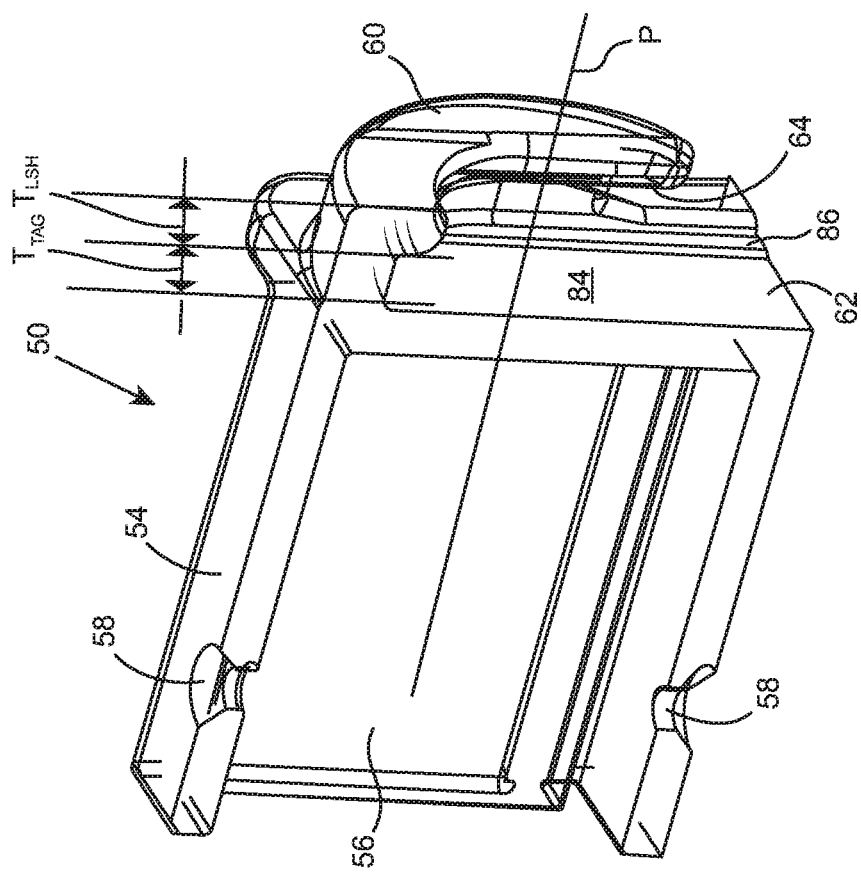
FIG. 4C
FIG. 4D

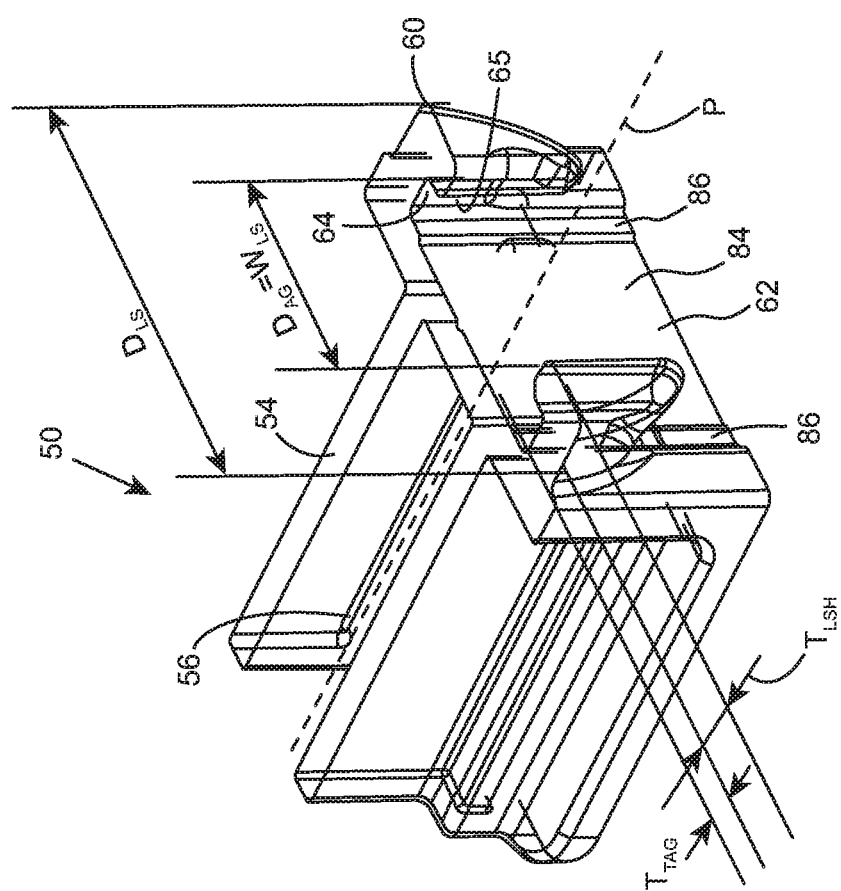

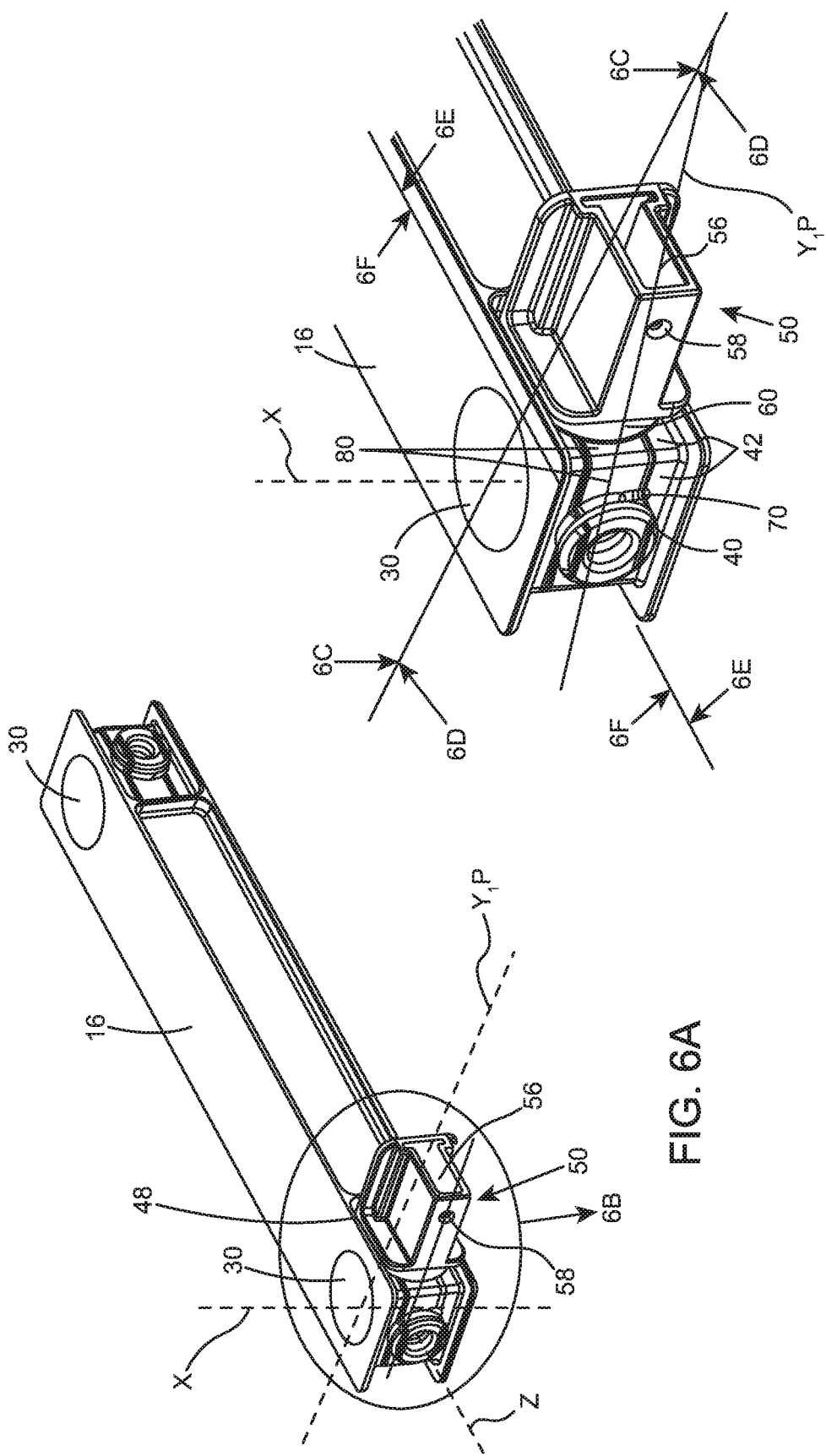

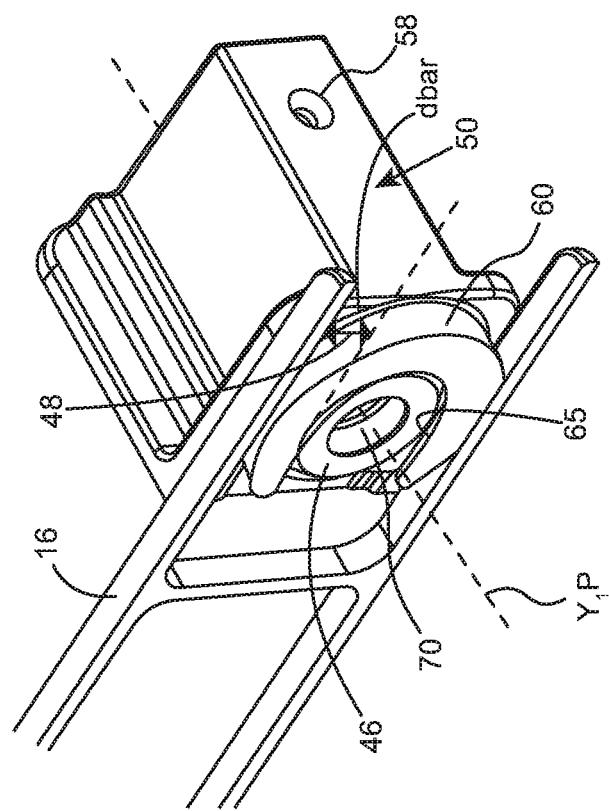
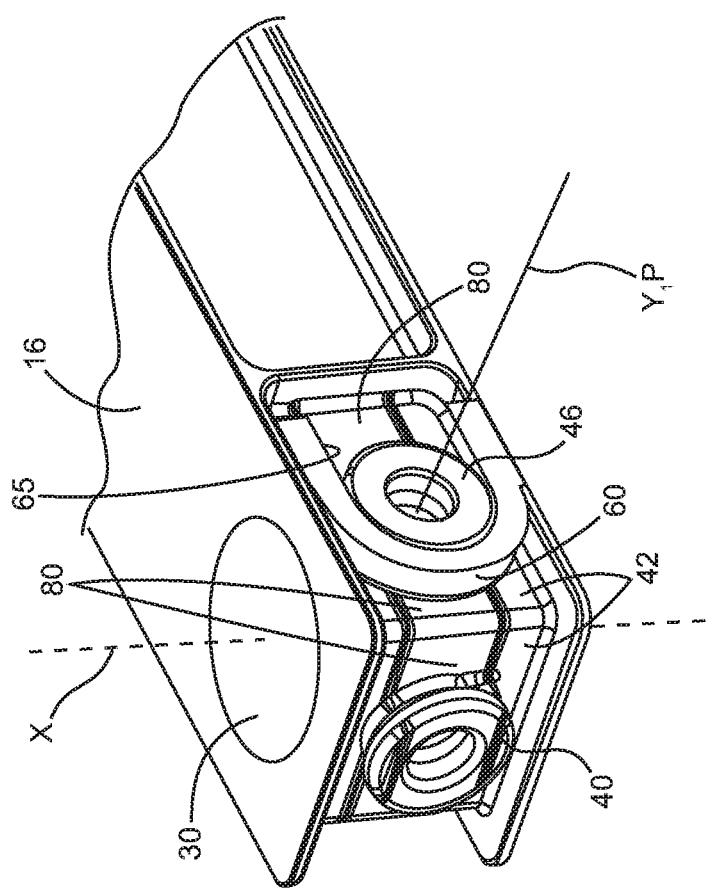
FIG. 6F
FIG. 6E

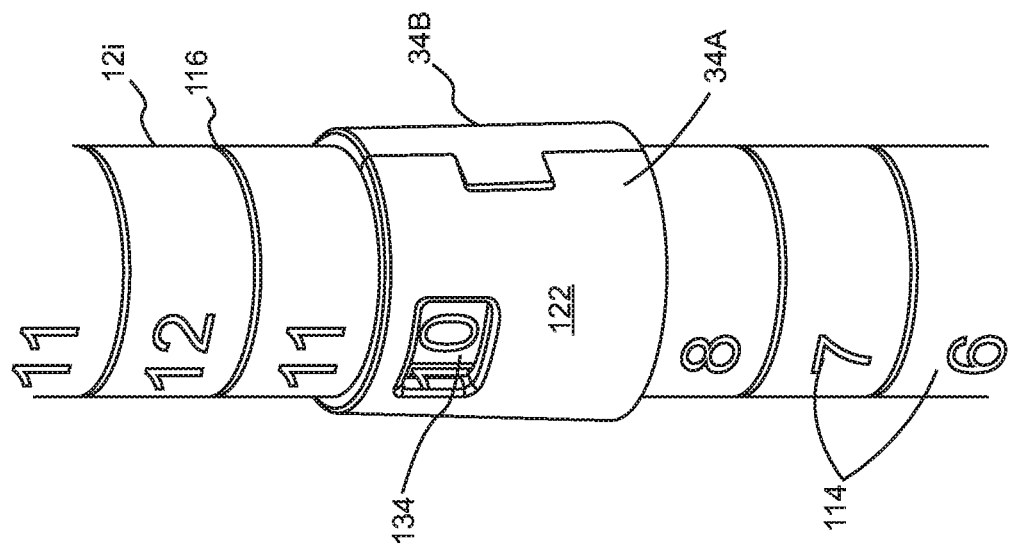
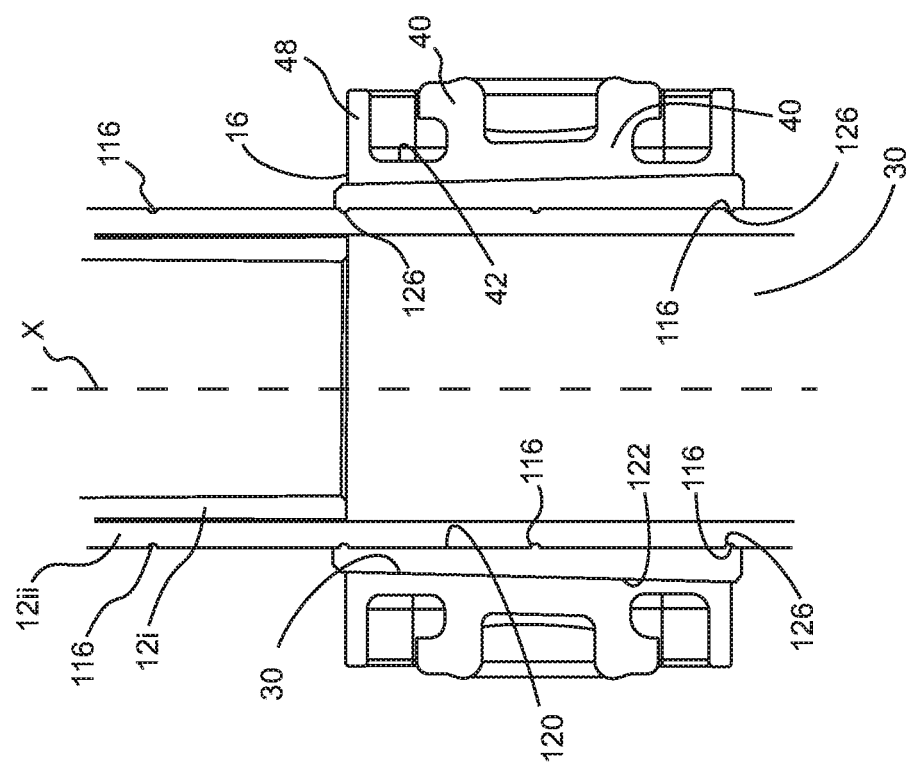

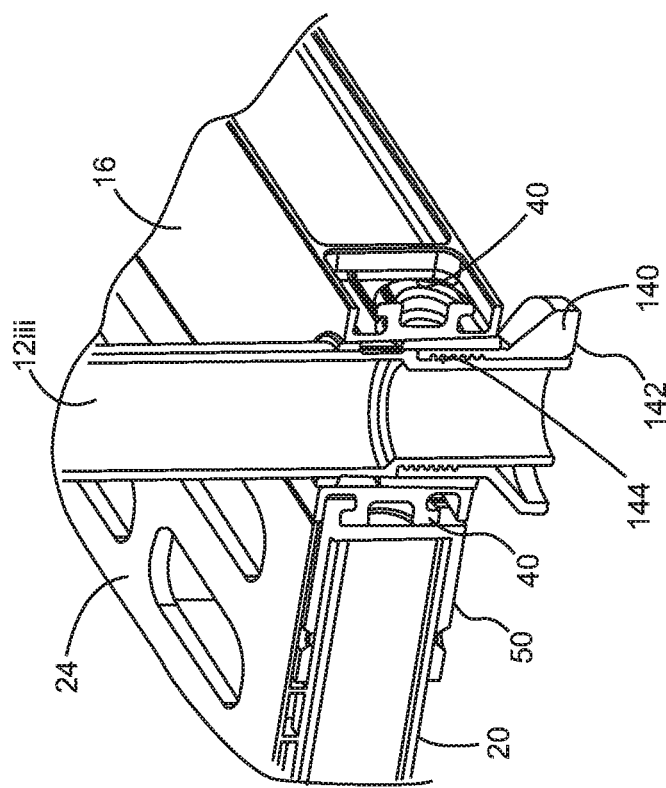
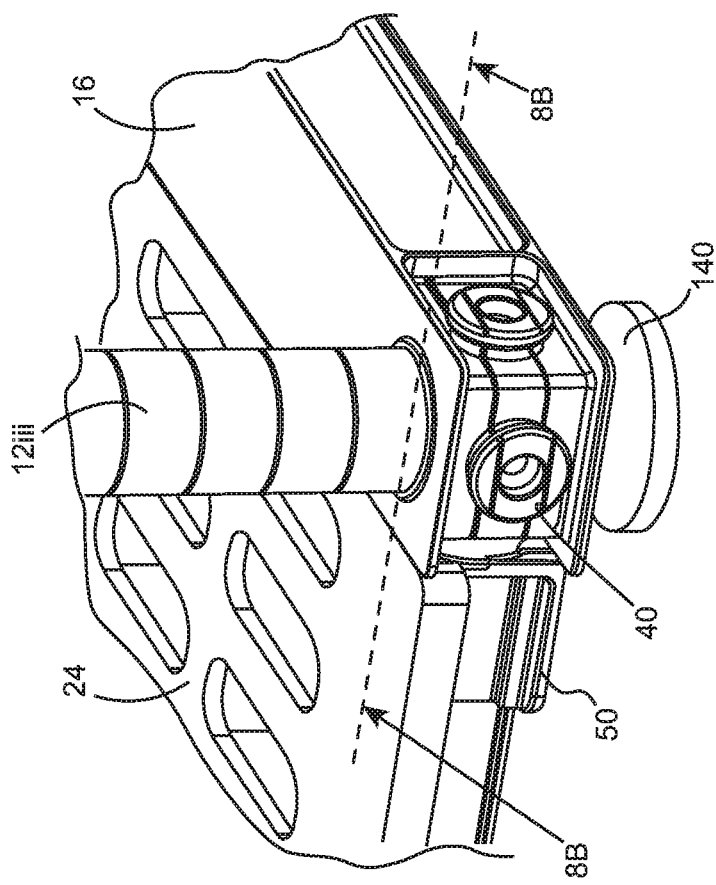
FIG. 8B
FIG. 8A

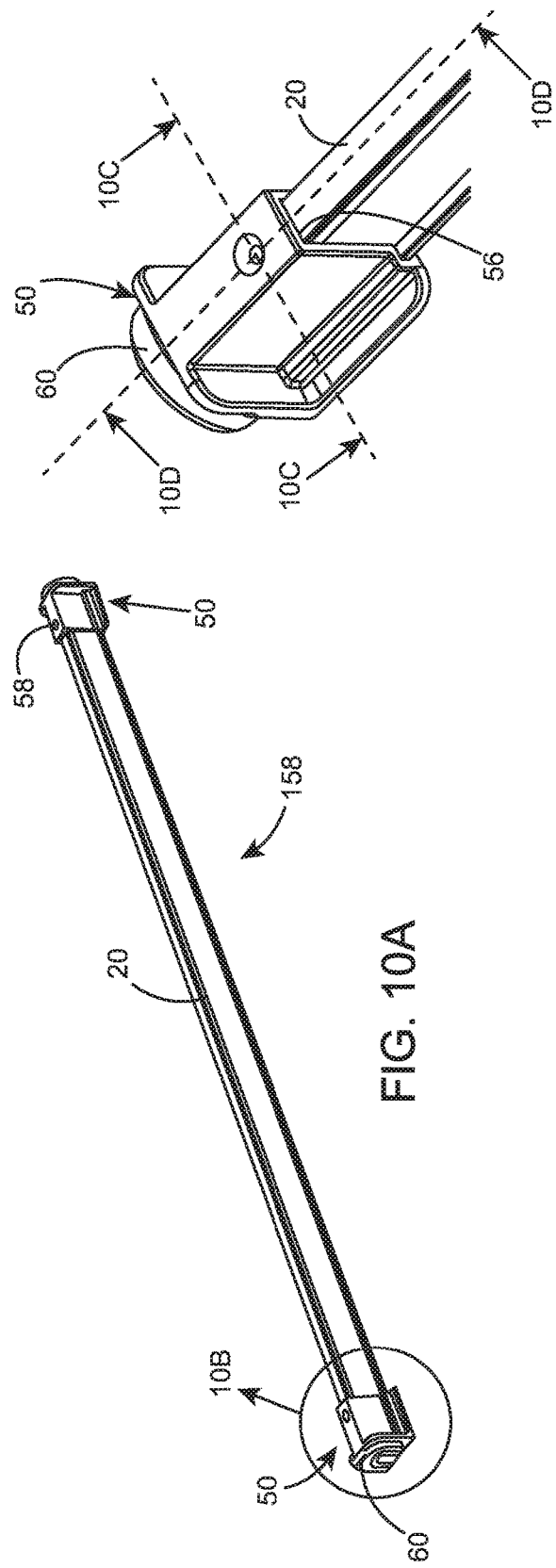
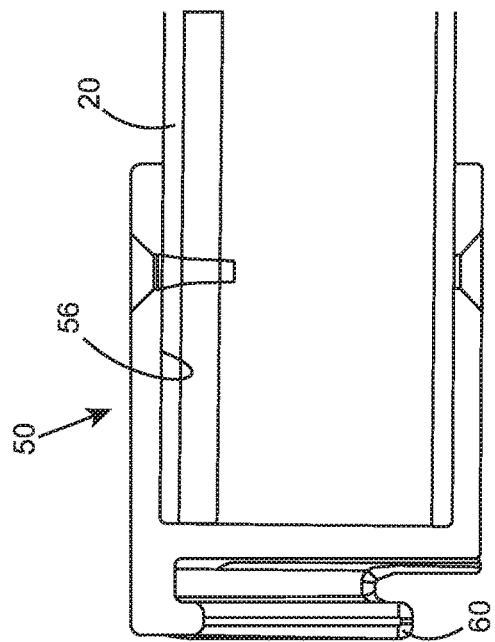
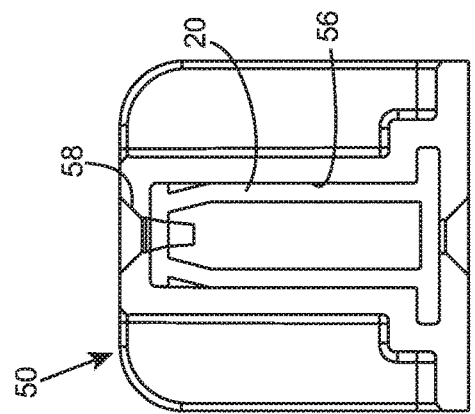
FIG. 10A
FIG. 10B
FIG. 10C
FIG. 10D

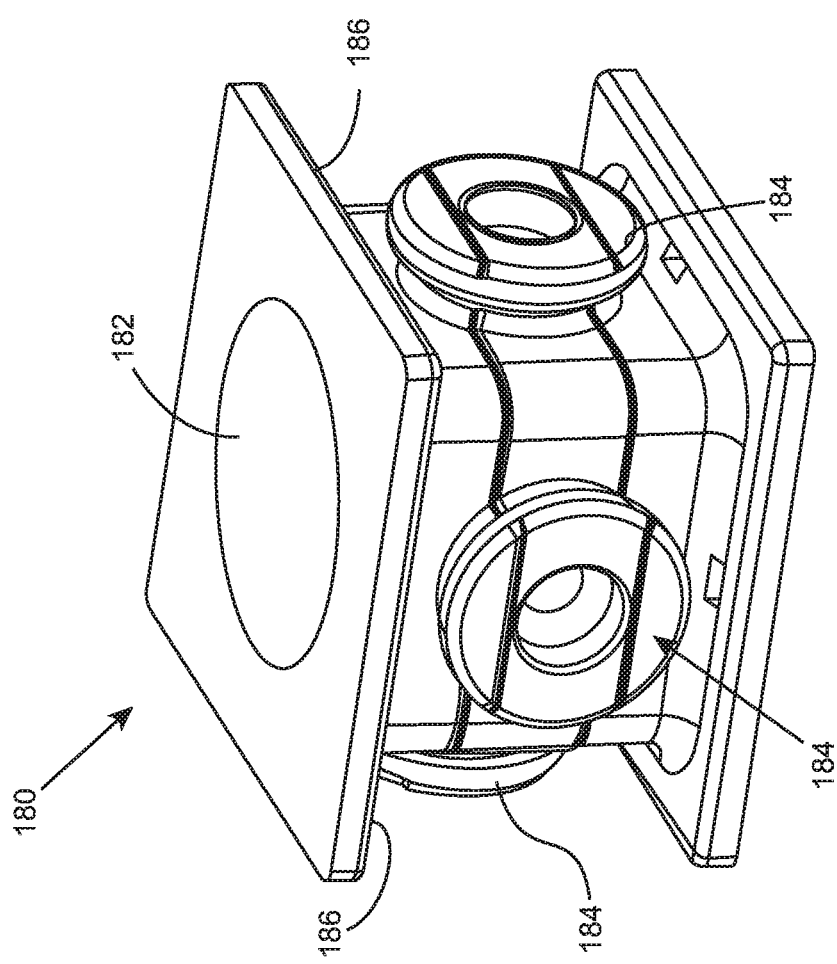

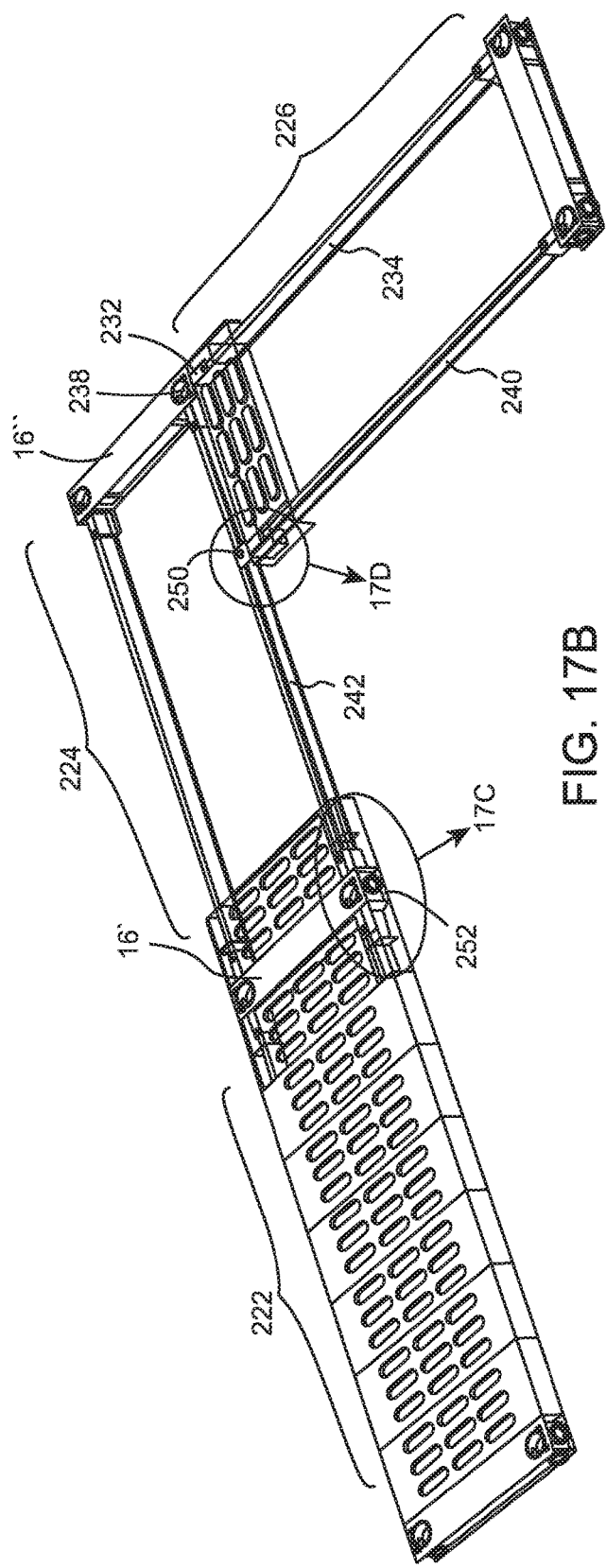
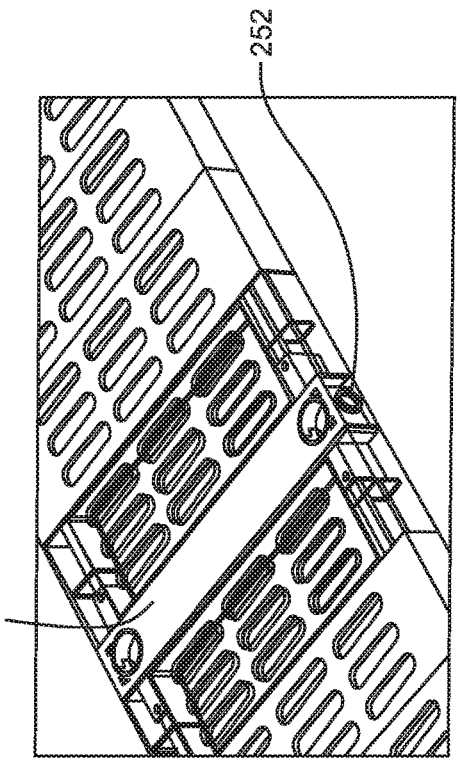
FIG. 17B
FIG. 17C

COUPLING SYSTEM AND CONSTRUCTION INCLUDING SAME

TECHNOLOGICAL FIELD

The present disclosure is concerned, by one of its aspects, with a coupling system, and by another aspect with a structure assembled using at least one such a coupling system.

The term construction as used hereinafter in the specification and claims denotes any structure wherein at least to elements thereof are articulated to one another using a coupling system according to the disclosure, such as furniture articles, shelving systems, building constructions, etc.

BACKGROUND ART

References considered to be relevant as background to the presently disclosed subject matter are listed below:
U.S. Pat. No. 10,299,588
U.S. Pat. No. 5,695,081
U.S. Published Patent Application No. 2005/0211652
Acknowledgement of the above references herein is not to be inferred as meaning that these are in any way relevant to the patentability of the presently disclosed subject matter.

BACKGROUND

U.S. Pat. No. 10,299,588 discloses a modular frame with a U-shaped hook member includes multiple upright columns each having at least two faces of each of the multiple upright columns have multiple couples of first through hole and second through hole defined therein. Multiple horizontal columns are respectively connected to a corresponding one of the at least two faces of a corresponding one of the multiple upright columns. Two connecting blocks respectively mounted into a corresponding one of two opposite ends of the tube. Two U-shaped hook members are respectively mounted into a corresponding one of the two connecting blocks. Each U-shaped hook member includes a first hook and a second hook extending therefrom and respectively engaged to a lower portion of a corresponding on of the first through holes and the second through holes.

U.S. Pat. No. 5,695,081 discloses a modular shelving system which can be easily assembled and disassembled is disclosed. The system comprises vertical posts, horizontal beams, side horizontal braces, connectors capable of being mounted on the vertical posts and having 1-4 identical ears protruding from the sides of the connector capable of being coupled to the horizontal beams and braces; and shelf pieces which are positioned on the horizontal beams. The width of the side horizontal braces is substantially similar to the width of the connectors, thus forming one continuous surface.

U.S. Published Patent Application No. 2005/0211652 discloses a collapsible laundry rack is provided that can be formed from a pair of collapsible legs and a plurality of cross members extending between the legs. A connector is provided between the cross members and the legs to secure the cross members relative to the legs. The connector is configured to allow for sequential assembly and disassembly of the cross members relative to the legs in order to simply assembly and disassembly operations.

GENERAL DESCRIPTION

According to a first aspect of the present disclosure there is a coupling system comprising a tab coupler and a socket coupler, said tab coupler comprising a locking tab extending from a locking face along a locking axis and configured with a round, T-like sectioned shape; said socket coupler comprising a U-shaped locking socket projecting from a mounting face of the socket coupler along a coupler axis and configured with a U-shaped tab arresting groove; the coupling system is configurable between an unlocked position whereat the locking socket slidingly receives the locking tab so that the locking axis and the coupler axis coincide, and a locked position upon rotating one of the tab coupler and the socket coupler about the coinciding axes, entailing snugly arresting of the locking tab by the locking socket, preventing sliding displacement and axial displacement along the coinciding axes.

According to a second aspect of the present disclosure there is a construction assembly comprising at least one first construction member and at least one second construction member, and a coupling system, said coupling system comprising a tab coupler and a socket coupler; wherein one of the tab coupler and the socket coupler is articulable with one of the first construction member and the second construction member, and the other one of the tab coupler and the socket coupler is articulable with the other one of the first construction member and the second construction member; and wherein said tab coupler comprising a locking tab extending from a locking face along a locking axis and configured with a round, T-like sectioned shape; said socket coupler comprising a U-shaped locking socket projecting from a mounting face of the socket coupler along a coupler axis and configured with a U-shaped tab arresting groove; the coupling system is configured between an unlocked position whereat the locking socket slidingly receives the locking tab so that the locking axis and the coupler axis coincide, and a locked position upon rotating one of the tab coupler and the socket coupler about the coinciding axes, entailing snugly arresting of the locking tab by the locking socket, preventing sliding displacement and axial displacement along the coinciding axes.

According to a specific aspect of the disclosure there is a shelving system comprising a plurality of support posts, at least one tab coupler mounted on each support post such that each tab coupler faces at least one equi-leveled tab coupler mounted on a neighboring support post; a plurality of socket couplers each fitted at respective opposite ends of support beams; wherein said tab coupler comprises at least one locking tab extending from a locking face along a locking axis and configured with a round, T-like sectioned shape; said socket coupler comprising at least one U-shaped locking socket projecting from a mounting face of the socket coupler along a coupler axis and configured with a U-shaped tab arresting groove; the coupling system is configured between an unlocked position whereat the locking socket slidingly receives the locking tab so that the locking axis and the coupler axis coincide, and a locked position upon rotating one of the tab coupler and the socket coupler about the coinciding axes, entailing snugly arresting of the locking tab by the locking socket, preventing sliding displacement and axial displacement along the coinciding axes; and one or more utility modules applicable over the support beams.

The term utility modules as used herein in the specification and claims denotes any article of utility articulable to a construction assembly or a shelving system according to the disclosure. A utility module can be, by way of example, a shelve, a tool rack, a hanging rack, a container, etc.

According to a particular configuration of the coupling system according to the disclosure, the neck of the locking tab and the head of the locking tab are cylindrical, and the locking socket head and the tab arresting grove have a U-like shape. This configuration facilitates sliding displacement of the socket coupler into engagement with the tab coupler, into the unlocked position, and wherein rotation of the socket coupler (or the tab coupler) entails engagement therebetween at the locked position.

The arrangement according to the disclosure is such that the locking socket has an opening having a width $W_{LS}$ substantially similar to a diameter of the tab arresting grove $D_{AG}$ ($W_{LS}=D_{AG}$), and the diameter of the tab arresting grove $D_{AG}$ is smaller than the diameter of the locking socket $D_{LS}$ ($D_{AG}<D_{LS}$); and the locking tab has a neck having a diameter $D_{LTN}$ smaller than a diameter of a head diameter $D_{LTH}$ ($D_{LTN}<D_{LTH}$); and wherein a thickness of locking tab neck $T_{LTN}$ is similar to or slightly greater than a thickness of the locking socket head $T_{LSH}$ ($T_{LTN} \geq T_{LSH}$); and a thickness of the tab arresting grove $T_{TAG}$ is similar or slightly greater than a thickness of locking tab head $T_{LTH}$ ($T_{TAG} \geq T_{LTH}$).

The terms diameter and width, mentioned herein the specification and claims refers to dimensions extending in a plane normal to the locking axis and the coupler axis, respectively, and the term thickness mentioned herein the specification and claims refers to dimensions extending along the locking axis and the coupler axis, respectively.

According to a particular configuration, the distance $d_{bar}$ between the barrier member and the neck of the locking tab is similar to, or slightly greater, than a width of the locking socket wall $W_{LSW}$ ($W_{LSW}=W_{LS}/2-D_{AG}/2$), i.e. $d_{bar} \geq W_{LSW}$. This arrangement prevents sliding displacement of the socket coupler with respect the tab coupler, when at the locked position, i.e. prevents unintentional displacement into the unlocked position.

The thickens $T_{BW}$ of the barrier member is similar to, or less than, the thickness of the locking socket $T_{LS}$ ($T_{BW} \leq T_{LS}$); (where $T_{LS}=T_{LSH}+T_{TAG}$).

Nomenclature Summary:
Diameter of the locking tab neck—$D_{LTN}$
Diameter of the locking tab head—$D_{LTH}$
Thickness of locking tab neck—$T_{LTN}$
Thickness of locking tab head—$T_{LTH}$
Diameter of the locking socket—$D_{LS}$
Diameter of the tab arresting grove—$D_{AG}$
Thickness of the locking socket head—$T_{LSH}$
Thickness of the tab arresting grove—$T_{TAG}$
thickens of the barrier member—$T_{BW}$
Thickness of the locking socket—$T_{LS}$ According to a configuration of the disclosure a post mounting assembly can be configured for detachably axial articulating a tab mounting unit over a cylindrical support post, said post mounting assembly comprising a post configured with at least one radial post engaging member, and a mounting shim comprising at least one shell member having an inside, concave surface corresponding with an external surface of the support post, and fitted at the concave surface with at least one radial shim engaging member configured for snug engagement with a corresponding radial post engaging member, and wherein a outside convex surface of the mounting shim has an arresting mechanism configured for engaging within a bore of the tab mounting unit.

The disclosure is further directed to a modular shelving kit comprising:

A plurality of support posts;

A plurality of side bars, each configured at opposite ends thereof with at least one tab coupler;

A plurality of support beams; A plurality of socket couplers associated with respective ends of each support beam and articulable with the tab couplers; and A plurality of shelving modules supportable by the support beams.

Any one or more of the following features, designs and configurations can be applied to any aspect of the present disclosure, separately or in various combinations thereof:

The tab coupler and the socket coupler can each be integrally articulated with, or articulable integrated, with the respective first construction member and second construction member;

The tab coupler can further comprise at least one barrier member spaced from the locking tab, wherein the socket coupler is slidably detachable from the tab coupler only at the unlocked position, along a path of displacement;

The at least one barrier member can be disposed so as to prevent sliding displacement of the socket coupler in a direction perpendicular to a path of displacement of the socket coupler with respect to the tab coupler;

The at least one barrier member can be a wall portion extending parallel to the path of displacement;

At the locked position the socket coupler is rotated at 90° with respect to the tab coupler, along the coinciding axes;

At the unlocked position an opening of the tab arresting groove faces in direction of the path of displacement;

A foolproof guard can be provided at the tab coupler, configured for prevention rotation of the socket coupler beyond the locked position;

The foolproof guard can extend at a $4^{th}$ quadrant of the round neck of the locking tab;

The foolproof guard can be configured as a tangential extension of the neck of the locking tab, said extension extending at either or both tangents at the $4^{th}$ quadrant;

At least one tab coupler can extend from a tab mounting unit, said tab mounting unit intercoupling the at least one tab coupler with any support unit;

The tab mounting unit can be a side bar of a shelving system, the shelving system can be configured with at least two right support posts and at least two left support posts, each of the right support posts and the left support posts interconnect with one another through a side bar, wherein said side bar is configured with at least one tab coupler, said at least one tab coupler disposed on a side face of the side bar and facing a tab coupler of the other of the right support posts and the left support posts;

The side bar can be configured with at least one secondary tab coupler, said secondary tab coupler disposed at a front face or rear face of the side bar;

Each end of the side bar can be configured with a right side tab coupler, a front or rear side tab coupler, and a left side tab coupler;

The tab mounting unit can be articulated to any support structure, such as a wall, a construction member, a support beam/rail, support post, etc., whereby a socket coupler can be articulated to the tab coupler of said tab mounting unit;

The tab mounting unit can be a prismatic body configured with at least one tab coupler over at least one face of the at least one prismatic body. According to one example the tab mounting unit can be a square unit configured with one or more tab couplers, one at each face thereof;

The tab mounting unit can be configured for mounting over a support post, said tab mounting unit comprising one or more radially disposed tab couplers;

The tab mounting unit can comprise several tab couplers, thus it can be utilized for articulating respective socket couplers thereto, at a coextensive and/or at an angled configuration, for assembling various construction assemblies. Such construction assemblies can assume coextending longitudinal constructions, H-shaped constructions, L-shaped constructions, A-shaped constructions, and the like;

The tab mounting unit can be configured with several levels of axially disposed tab couplers;

The tab mounting unit can be configured for coaxially mounting over a support post;

The tab mounting unit can be configured for articulation over a support beam of a construction assembly;

The mounting shim of the post mounting assembly can comprise a single shell member configured for snug applying over the support post, the single shell member spanning approximately 180°;

The mounting shim of the post mounting assembly can comprise two or more shell members configured for snug applying over the support post;

The two or more shell members of the post mounting assembly can interconnect with one another;

The outside surface of the mounting shim can be configured with a tapering surface facilitating as arresting mechanism for engaging within a correspondingly tapering cross section of within the bore of the tab mounting unit;

The arresting mechanism of the mounting shim can be configured as a shoulder for arresting a portion of the bore of the tab mounting unit;

The radial shim engaging member at the least one shell member can comprise one or more radial ribs or radial grooves, configured for engaging with corresponding other of radial ribs or radial grooves configured at the external surface of the support post;

The support post can be configured with indicia representing axial increments. The indicia can be equally distanced from one another;

The radial shim engaging member can be configured with a window for visualizing the indicia marked over the support post;

The tab coupler can be integral with or integrated to a respective construction member;

The socket coupler can be integral with or integrated to a respective construction member;

Respective ends of support beams of a shelving system can be integral with, or integrated to socket couplers;

A support post of a shelving system can be modular and assembled of one or more support posts coaxially coupleable to one another;

A shelving system or a construction assembly can comprise a leveling arrangement configured at respective bottom support posts, for level adjustment. The leveling arrangement can be a threading configured at a bottom most support post and a support leg member screw coupleable with the threading, whereby rotating the support leg member entails axial displacement thereof with respect to the support post;

Bottom most support posts of a shelving system or a construction assembly can be configured with a wheeling arrangement;

A tolerance cancelation arrangement can be configured between the tab coupler and the socket coupler, to thereby cancel or reduce to minimum tolerances therebetween;

The tolerance cancelation arrangement can be configured as one or more socket tolerance projections configured at one of the mounting face and the head face of the socket coupler, and the locking face and the head face of the locking tab; and complimentary one or more tab tolerance projections configured at the other one of the mounting face and the head face of the socket coupler, and the locking face and the head face of the locking tab; wherein at the unlocked position said socket tolerance projections and said tab tolerance projections are coaxially oriented and do not interlace with one another, and at the locked position said socket tolerance projections and said tab tolerance projections bear against one another so as to apply axial pressure between the tab coupler and the socket coupler;

The socket tolerance projections project from the mounting face and the head face of the socket coupler substantially the same extent as the tab tolerance projections projects from the locking face and the head face of the locking tab, whereby at the unlocked position they zero each other, and at the locked position their axial projection accumulates to apply the axial pressure between the tab coupler and the socket coupler;

The socket tolerance projections and the tab tolerance projections are co-oriented at the unlocked position, and intersect one another at the locked position;

The coupling system can be configured with a securing arrangement configured at one or both of the tab coupler and the socket coupler, for preventing spontaneous displacement from the locked position into the unlocked position;

The securing arrangement can be a projection configured at one of the tab coupler and the socket coupler, and a depression configured at the other one of the tab coupler and the socket coupler, wherein said projection is snappingly engageable by the depression.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a shelving system according to an example of the present disclosure;

FIG. 1B is an isolation of the portion marked 1B in FIG. 1A;

FIG. 1C is an enlarged view of the portion marked 1C in FIG. 1B;

FIG. 1D is an exploded view of FIG. 1C;

FIG. 4C is a vertical section along line 4C-4C in FIG. 4A;

FIG. 4D is a vertical section along line 4D-4D in FIG. 4A;

FIG. 4E is a horizontal section along line 4E-4E in FIG. 4A;

FIG. 6A is a perspective view of the coupling system, at an assembled, unlocked position;

FIG. 6B is an enlargement of the portion marked 6B in FIG. 6A;

FIG. 6E is a vertical section along line 6E-6E in FIG. 6B;

FIG. 6F is a vertical section along line 6F-6F in FIG. 6B (being a mirror view of FIG. 6E);

FIG. 7C is a planar view of FIG. 7B;

FIG. 7D is an isometric view of only the support pole and a mounting shim applied thereover;

FIG. 8A is an enlarged view of the portion marked 8A in FIG. 1A, illustrating a ground piece articulated to a support post of the shelving system;

FIG. 8B is a vertical section along line 8B-8B in FIG. 8A;

FIGS. 10 to 14 illustrate consecutive steps of assembling a shelving system configured with a coupling system according to an example of the disclosure, wherein:

FIG. 10A is a perspective view of a support beam fitted at its respective ends with a socket coupler;

FIG. 10B is a rotated enlargement of the portion marked 18B in FIG. 10A;

FIG. 10C is a section along line 10C-10C in FIG. 10B;

FIG. 10D is a section along line 10D-10D in FIG. 10B;

FIG. 15 is a perspective view of a square tab mounting unit, configured for mounting on a support post and comprising four tab couplers;

FIG. 17B is a partial view of a level of the L-shaped shelving system shown in FIG. 17A;

FIG. 17C is an enlargement of the portion marked 17C in FIG. 17B;

DETAILED DESCRIPTION OF EMBODIMENTS

Figure 2B:
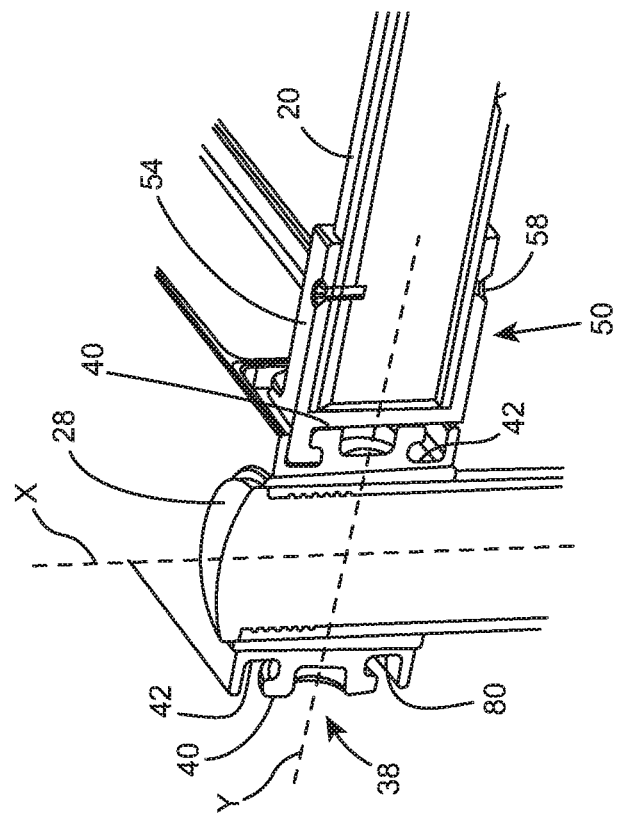
FIG. 2B is a longitudinal section along line 2B-2B in FIG. 2A.
Figure 2A:
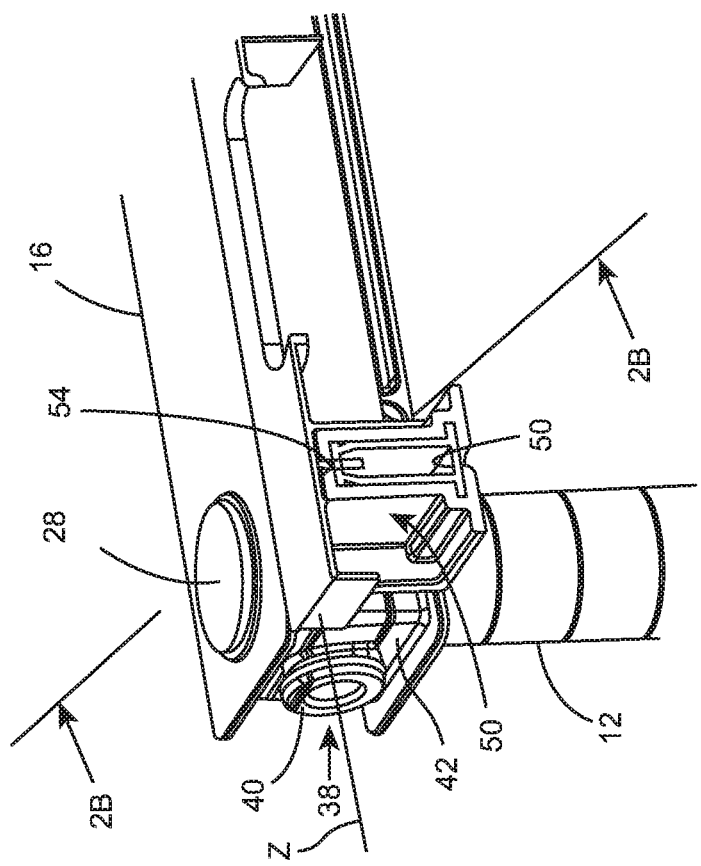
FIG. 2A is an enlarged view of the portion marked 2A in FIG. 1C.

Attention is first directed to FIGS. 1A to 1D of the drawings, illustrating a construction assembly, which in the present example is a four level shelving system generally designated 10. However, it is appreciated the disclosure can be related to any other type of construction assemblies, of any type and purpose, made of a variety of materials, without departing from the scope of the discloser.

The shelving system 10 comprises four support posts/legs 12A-12D (non-specifically designated 12 and which will be discussed hereinafter in greater detail, are each assembled of several segments), wherein two right-side support posts 12A and 12B are interconnected to one another by a plurality of horizontally disposed right-side side bars 16, and likewise both left-side support posts 12C and 12D are interconnected to one another by a plurality of tab mounting units, which at the particular design are side bars 16 (equally leveled with the right-side side bars, and further wherein the right-side side bars are identical with the left-side side bars, as will be seen hereinafter). A support beam 20 extends between each two front side bars and between each two rear side bars, giving rise to a support frame 22 (FIG. 1C) configured out of two side bars and two support beams 20, with a plurality of shelving modules, namely shelving tiles 24 articulated between the parallelly disposed support beams 20. It is appreciated that the shelving modules are an example and that a homogeneous shelve (i.e. single board) or even other types of modules can be mounted over the support beams 20.

Further noted, the shelving system 10 is a floor mounted system (not a wheeled one, as will be discussed later) and the top most support post segment is fitted with a decorative end plug 28.

Figure 3B:
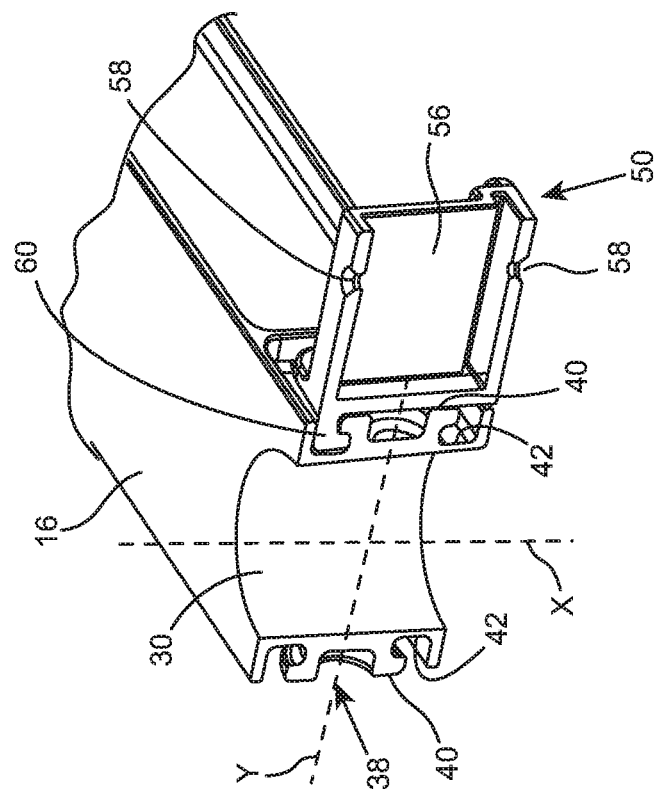
FIG. 3B is a vertical section along line 3B-3B in FIG. 3A.
Figure 3A:
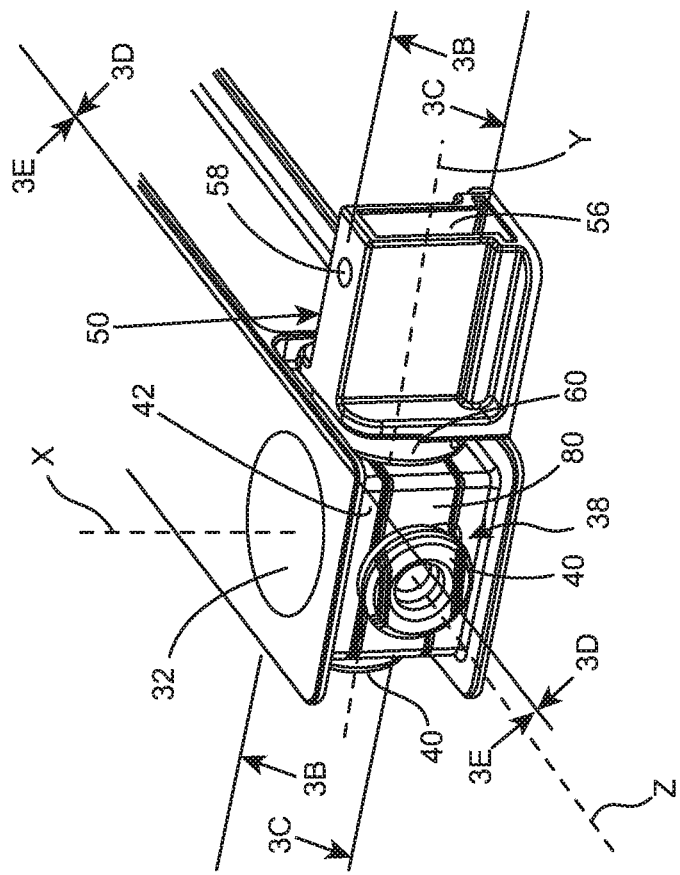
FIG. 3A is an isolated view of FIG. 2A, of the coupling system only, at a locked position.
Figure 3D:
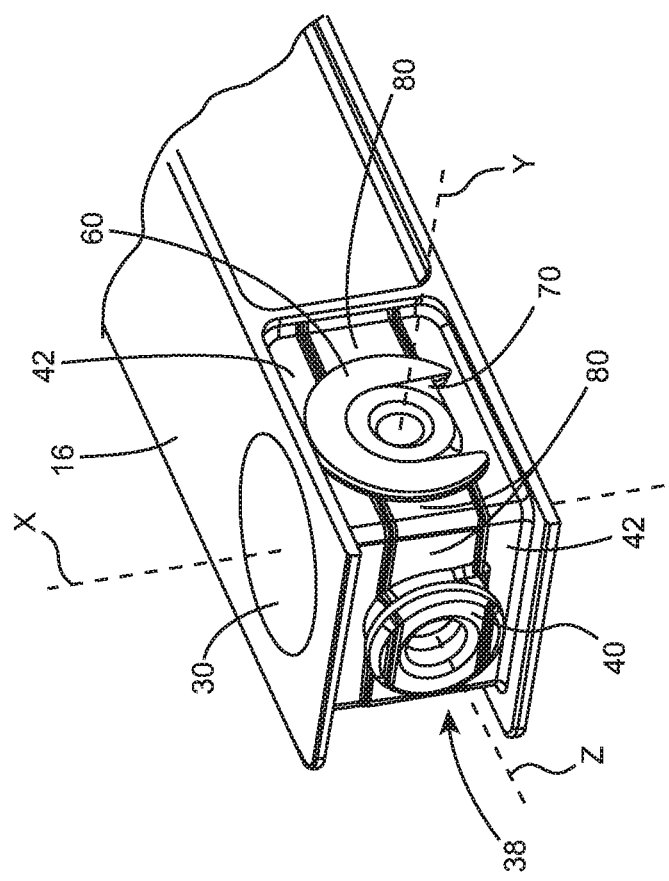
FIG. 3D is a vertical section along line 3D-3D in FIG. 3A.
Figure 3C:
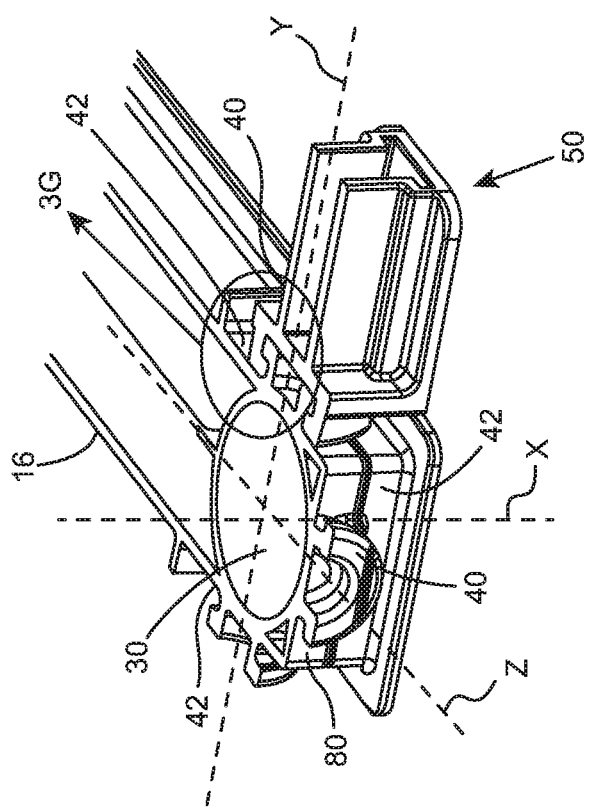
FIG. 3C is a horizontal section along line 3C-3C in FIG. 3A.

The side bars 16 are made of solid material (e.g. molded polymeric material) and are each configured with a pair of spaced bores 30 configured with a cross section tapering along the longitudinal axis X (best seen in FIGS. 5D, 5E, 7B and 7C) for mounting over the support beams 20 by a pair of mounting shims 34 (to be discussed in greater detail hereinafter; In FIGS. 7B-7E referred to specifically as 34A and 34B). Respective ends of the side bars 16 (tab mounting units) are each fitted with three orthogonal tab couplers, generally designated 38, disposed at three respective faces of the side bars 16. The tab couplers 38 extend coplanar (i.e. at the same elevation along the longitudinal X axis) and are disposed at right angles Y and Z (e.g. FIG. 3C).

The coupler 38 is part of a coupling system according to the disclosure, whereby particular reference is now being made to the tab coupler 38 comprising a locking tab 40 extending along a locking axis (axes Y and Z, respectively) from a locking face 42 and configured with a round, T-like sectioned head with a cylindrical neck portion 46. As can be seen, best in FIG. 5E, the arrangement is such that the locking tab 40 has a neck having a diameter $D_{LTN}$ smaller than a diameter of a head diameter $D_{LTH}$ ($D_{LTN} < D_{LTH}$); and wherein the locking tab neck has a thickness $T_{LTN}$ and a locking tab head thickness $T_{LTH}$. A front (head) face and a back wall face of the locking tab 40 are substantially parallel to one another and to the locking face 42. The tab coupler 38 is further configured with a barrier member in the form of wall 48 extending at least along a portion opposite said locking tab and spaced from the locking tab 40 at a distance $d_{bar}$ measured between the barrier wall and the neck 46 of the locking tab 40, and the barrier wall 48 has a thickens $T_{BW}$ as measured from the locking face 42.

Turning now to FIGS. 4A to 4E reference is made to a socket coupler 50 of the coupling system, configured for engagement with the tab coupler 38 discussed hereinabove. The socket coupler 50 comprises a body portion 54 with a receiving receptacle 56 and at least one screw fastener bore 58 for coupling thereto any construction element (e.g. support beams 20, as will be discussed hereinafter), though it is appreciated that any construction element can be integral with, or integrated with the socket coupler 50.

The socket coupler 50 is further configured with a U-shaped locking socket 60 projecting from a mounting face 62 along a socket coupler axis P, extending normal to said mounting face 62, said locking socket having an opening of width $W_{LS}$. Locking socket 60 is further configured with a U-shaped tab arresting groove 64, wherein inside side walls 65 of the tab arresting groove 64 extend substantially parallel to one another (FIGS. 4E, 4D).

The locking socket 60 has an external diameter $D_{LS}$ and the tab arresting grove 64 has a diameter $D_{AG}$ is smaller than the diameter of the locking socket $D_{LS}$ ($D_{AG} < D_{LS}$). The locking socket head has a thickness $T_{LSH}$ and the tab arresting grove has a thickness $T_{TAG}$.

The arrangement according to the disclosure is such that the following relations occur:

the width $W_{LS}$ of the locking socket 60 is substantially similar to a diameter of the tab arresting grove $D_{AG}$ ($W_{LS} = D_{AG}$);

the diameter of the tab arresting grove $D_{AG}$ is smaller than the diameter of the locking socket $D_{LS}$ ($D_{AG} < D_{LS}$);

the neck diameter $D_{LTN}$ of the locking tab is smaller than a diameter of the head diameter $D_{LTH}$ ($D_{LTN} < D_{LTH}$);

the thickness of locking tab neck $T_{LTN}$ is similar to or slightly greater than a thickness of the locking socket head $T_{LSH}$ ($T_{LTN} \geq T_{LSH}$); and the thickness of the tab arresting grove $T_{TAG}$ is similar or slightly greater than a thickness of locking tab head $T_{LTH}$ ($T_{TAG} \geq T_{LTH}$).

Figure 5A:
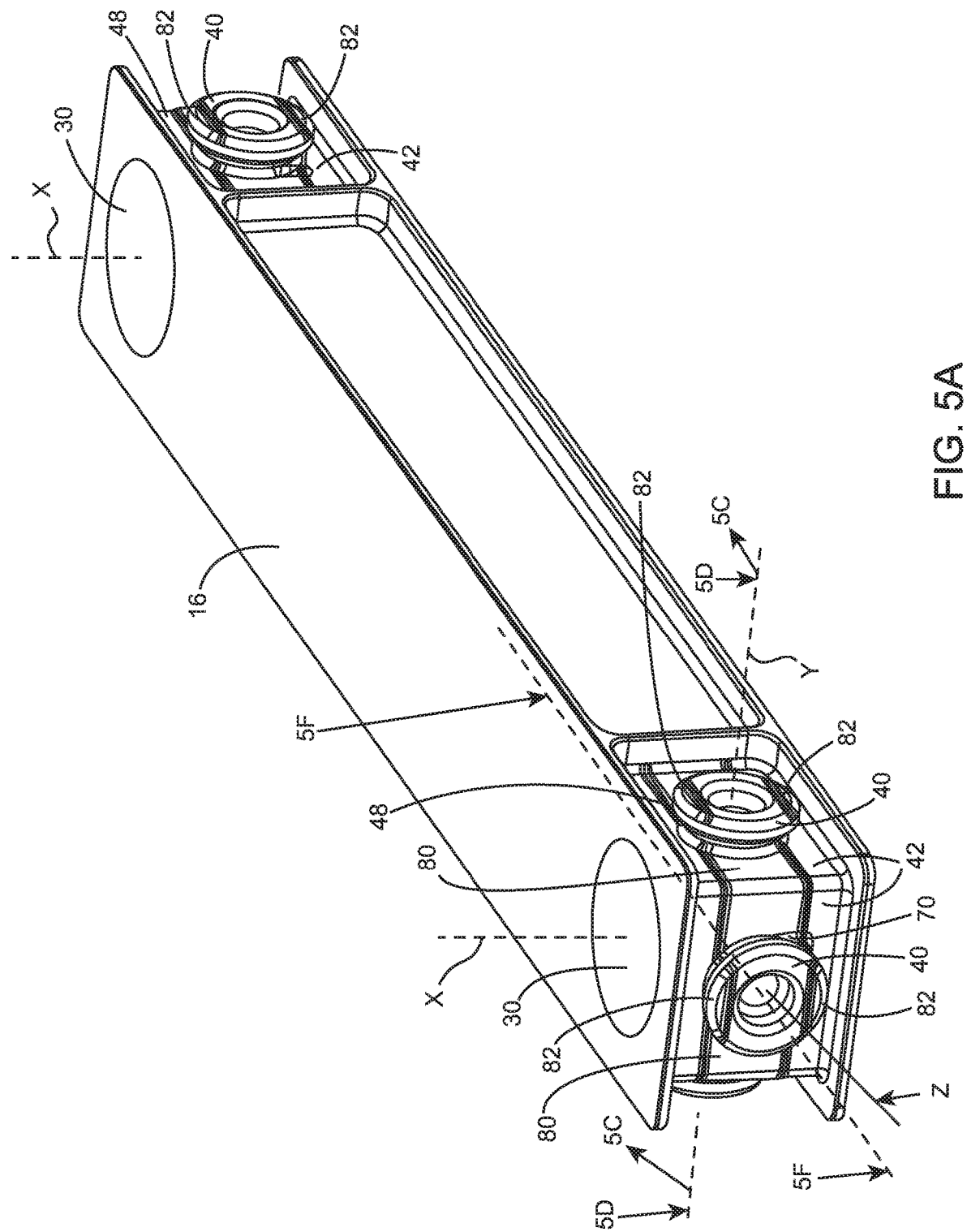
FIG. 5A is a top perspective view of a side bar of the shelving system according to an example of the disclosure.
Figure 5C:
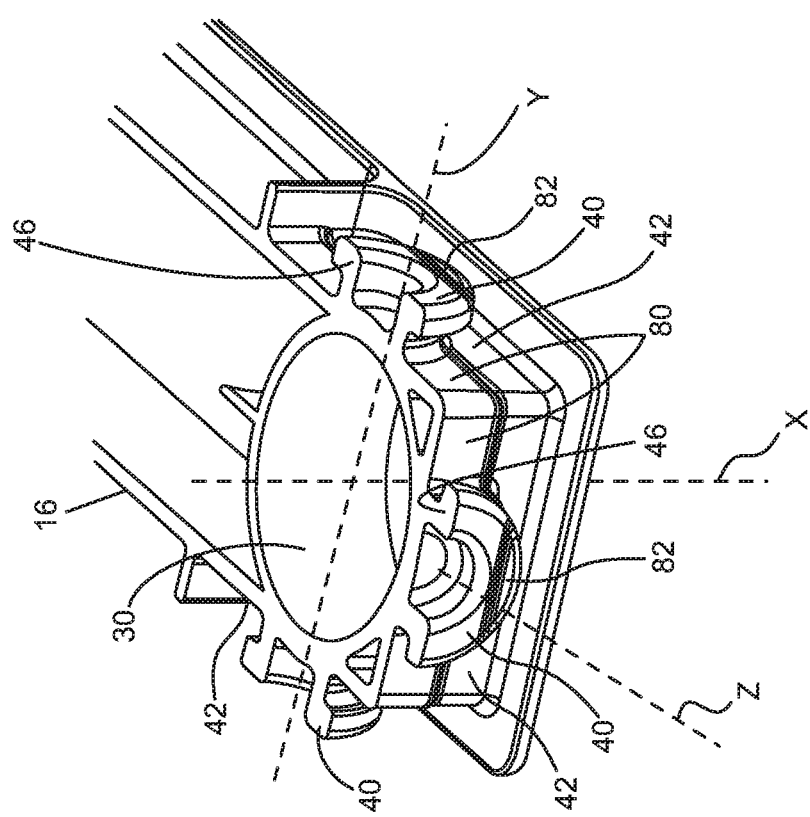
FIG. 5C is a horizontal section along line 5C-5C in FIG. 5A.
Figure 5B:
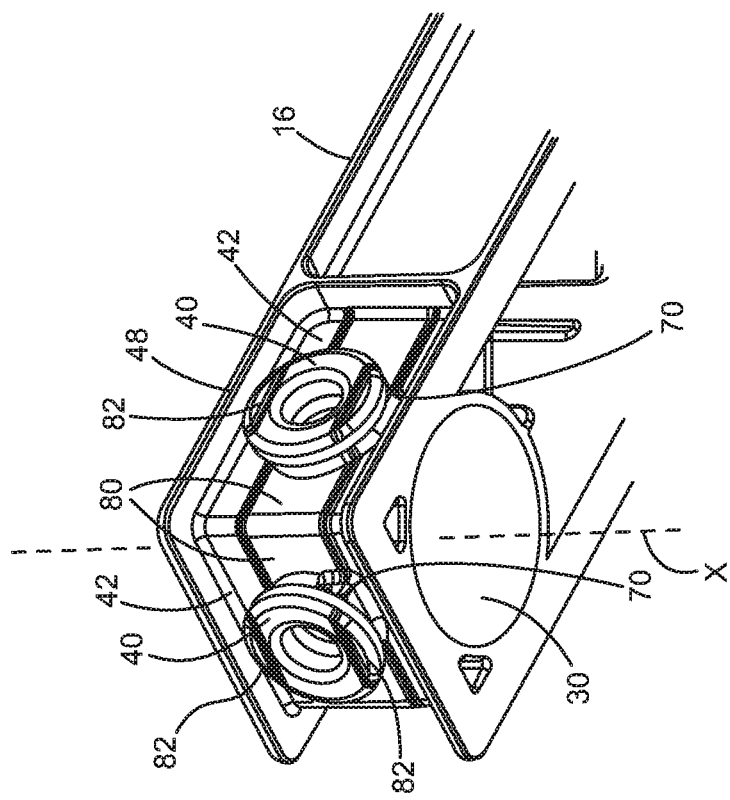
FIG. 5B is an enlarged bottom perspective view of the portion marked 5B in FIG. 5A.
Figures 5D, 5E:
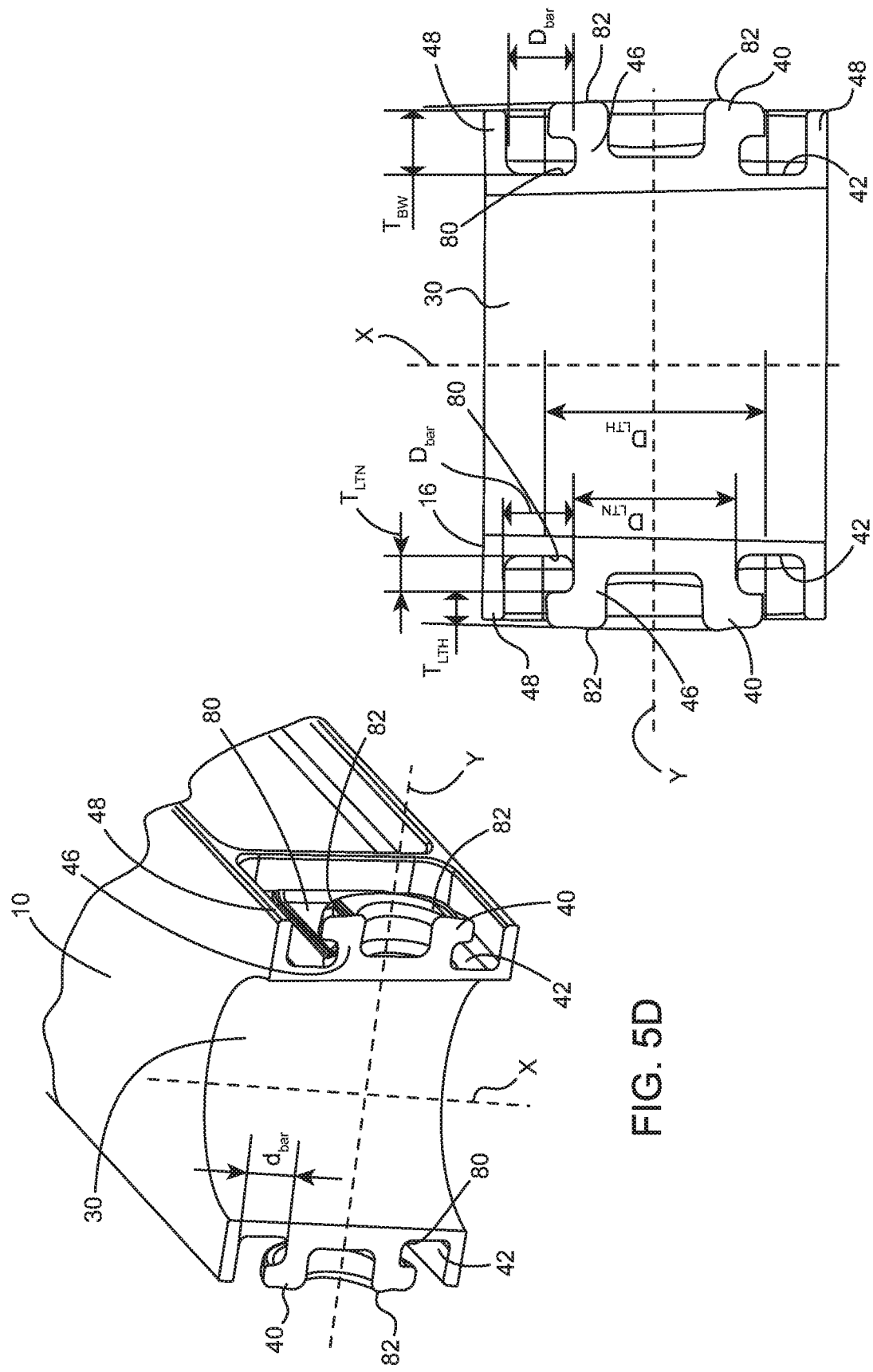
FIG. 5D is a vertical section along line 5D-5D in FIG. 5A.
FIG. 5E is a planar side view of FIG. 5D.
Figure 5F:
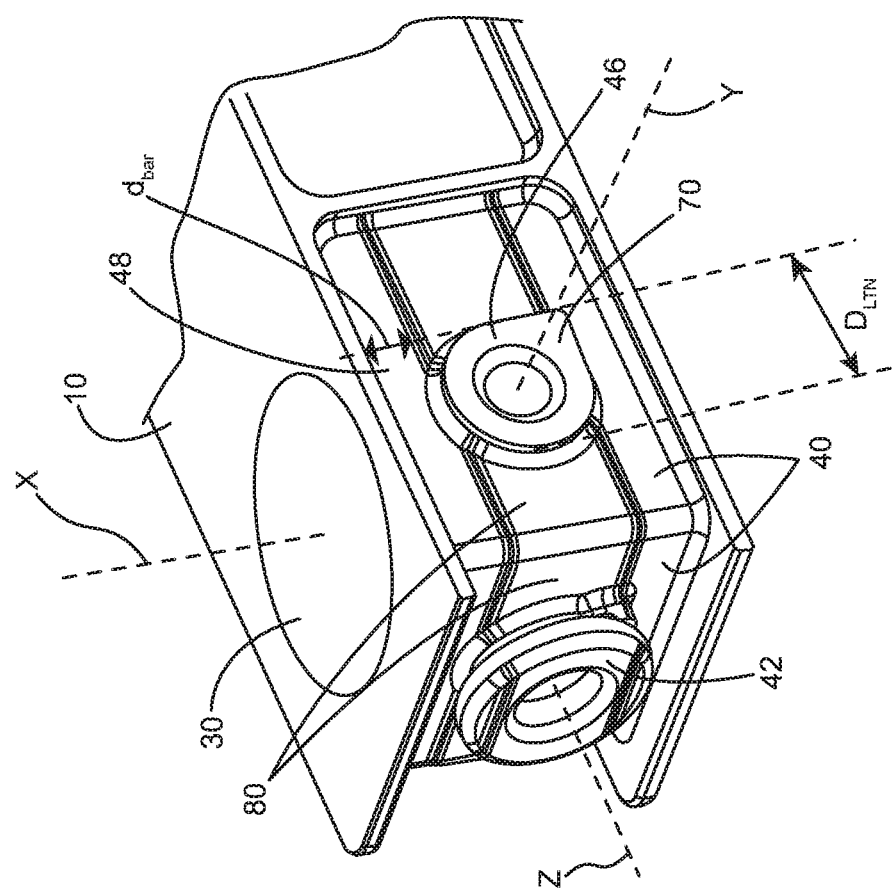
FIG. 5F is a vertical section along line 5F-5F in FIG. 5A.
Figure 6D:
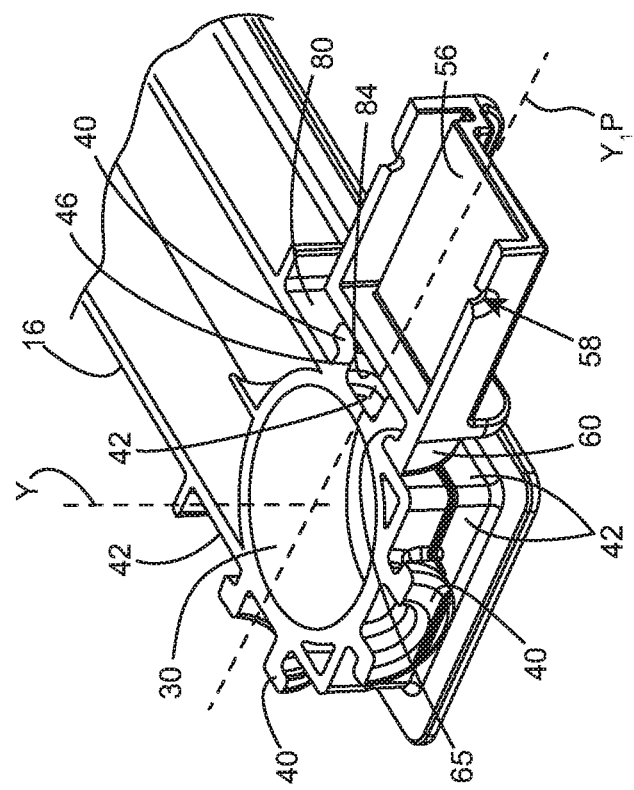
FIG. 6D is a horizontal section along line 6D-6D in FIG. 6B.
Figure 6C:
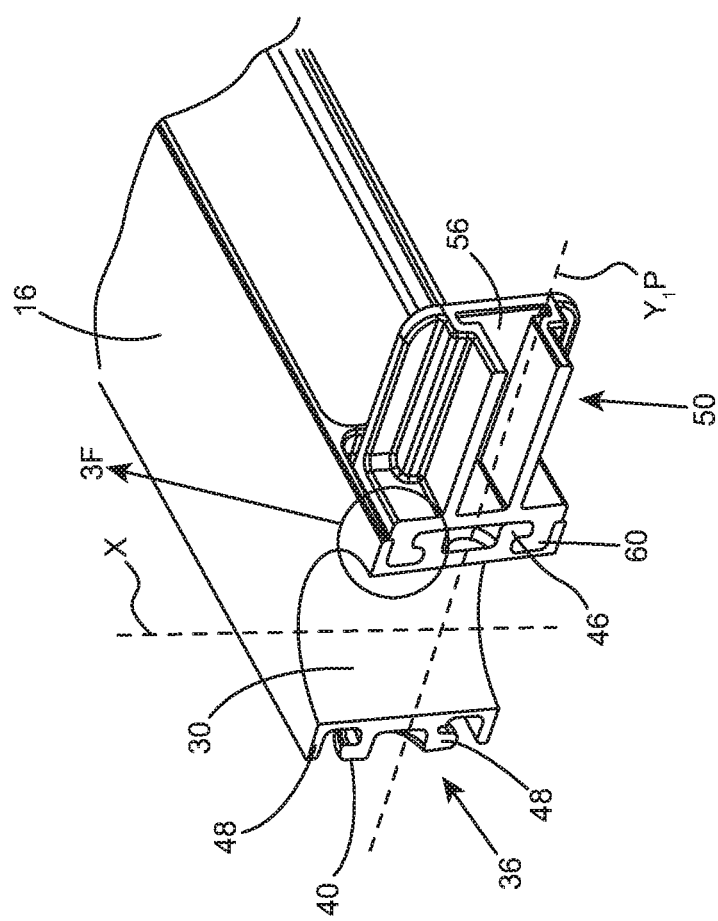
FIG. 6C is a vertical section along line 6C-6C in FIG. 6B.
Figure 7B:
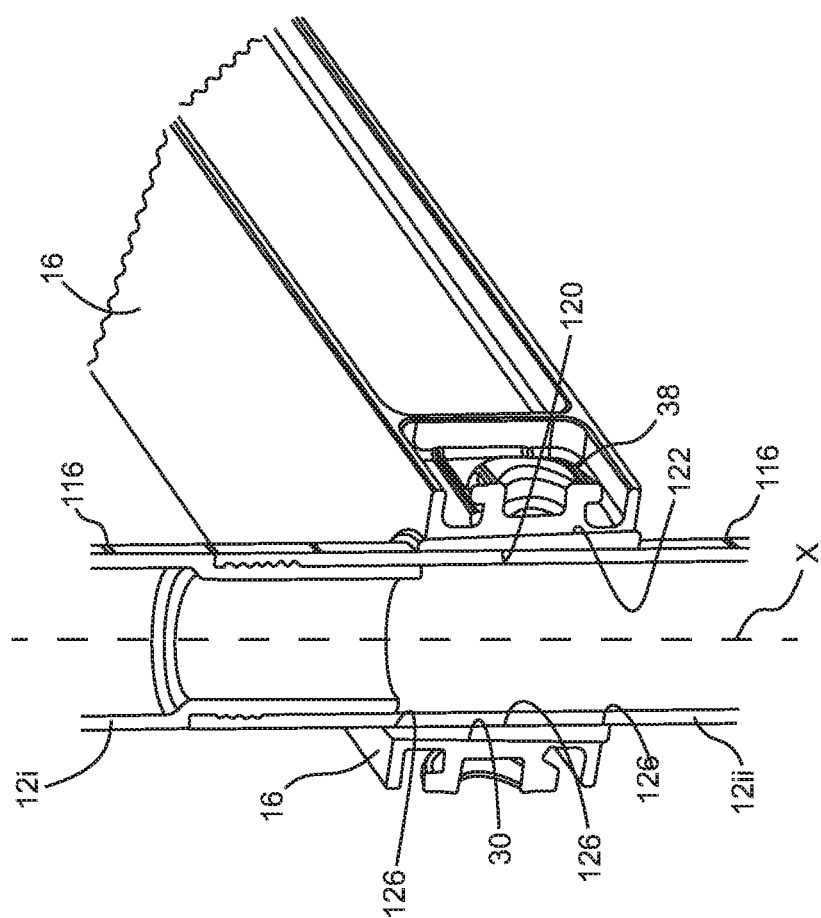
FIG. 7B is a vertical section along line 7B-7B of the portion marked 7B in FIG. 7A.
Figure 7A:
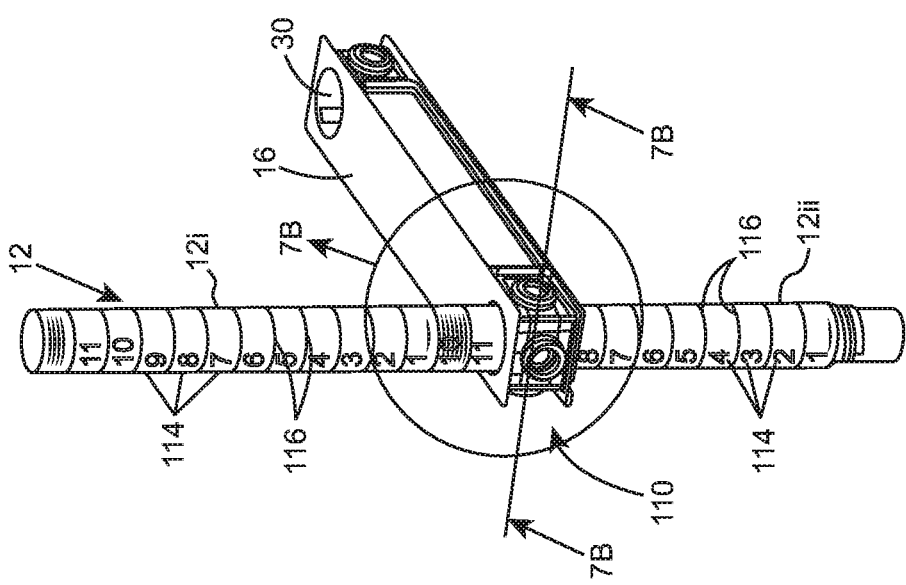
FIG. 7A illustrates a side bar mounted over a support pole according to an example of the shelving system.
Figure 7E:
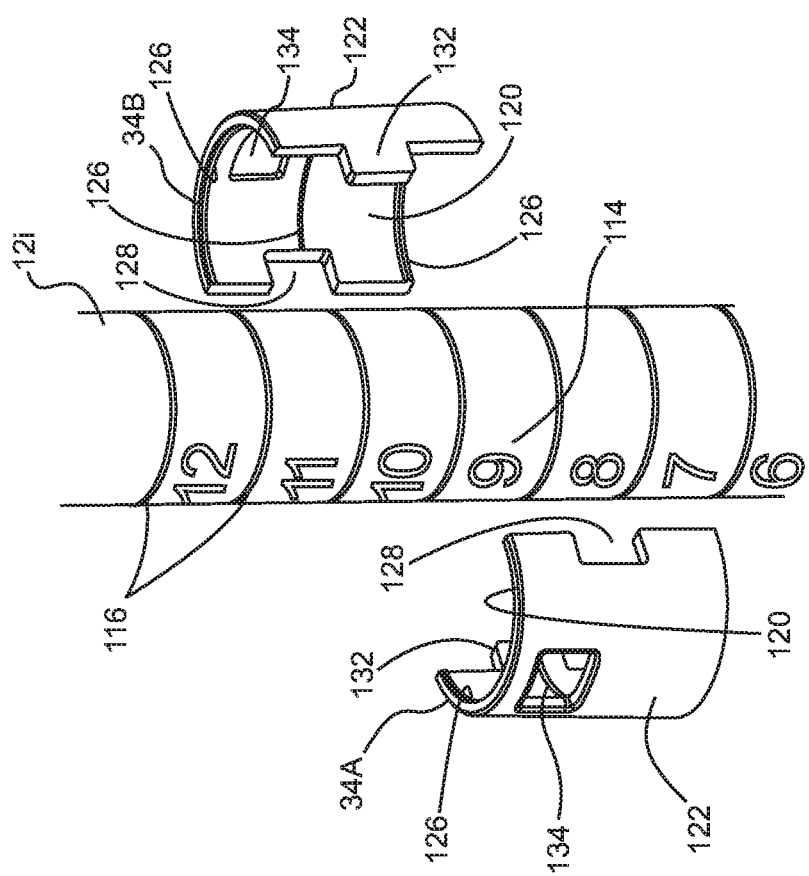
FIG. 7E is an exploded view of FIG. 7D.

As can further be seen, the tab coupler is optionally configured with a foolproof guard 70 (best seen in FIGS. 3E, 5F, 6F), for prevention rotation of the socket coupler beyond the locked position. The foolproof guard 70 is in the form of an extension along two tangents at a $4^{th}$ quadrant of the round neck 46 of the locking tab 40, such that it does not project beyond the radii along the X and Z axes. The foolproof guard 70 prevents over rotation of the socket coupler 50 beyond the locked position (i.e. beyond 90°).

The set of ratios between elements of the coupling system, namely locking tab 40 and the locking socket 60, plays a role in locking engagement of the tab coupler 38 and the socket coupler 50.

Figure 3F:
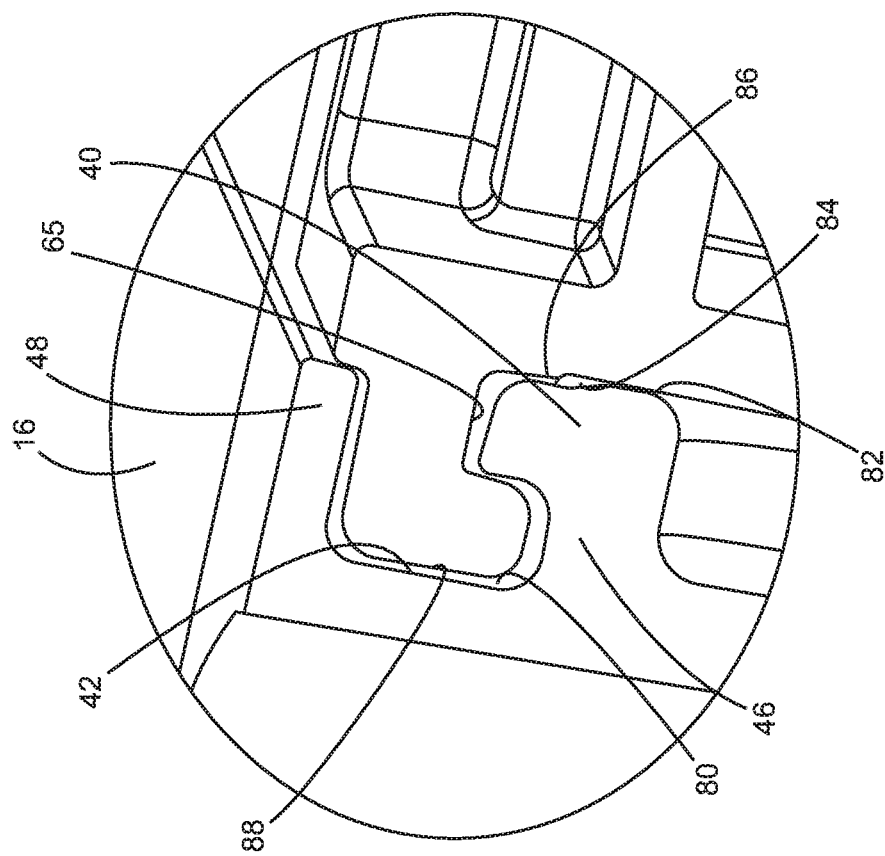
FIG. 3F is an enlargement of the portion marked 3F in FIG. 6C, illustrating the tolerance cancelation arrangement at the unlocked position.
Figure 3E:
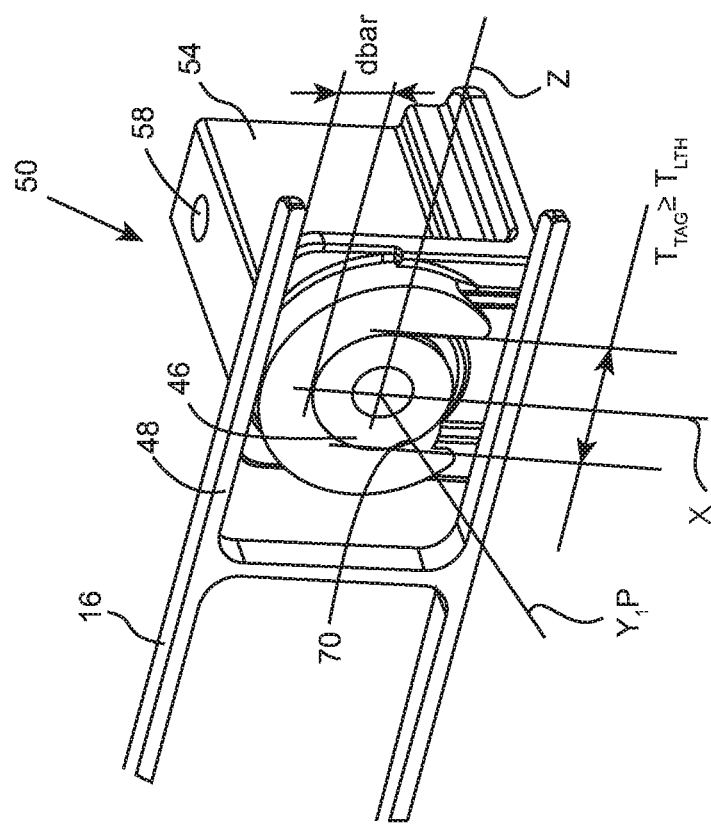
FIG. 3E is a vertical section along line 3E-3E in FIG. 3A (being a mirror view of FIG. 3D)
Figure 3G:
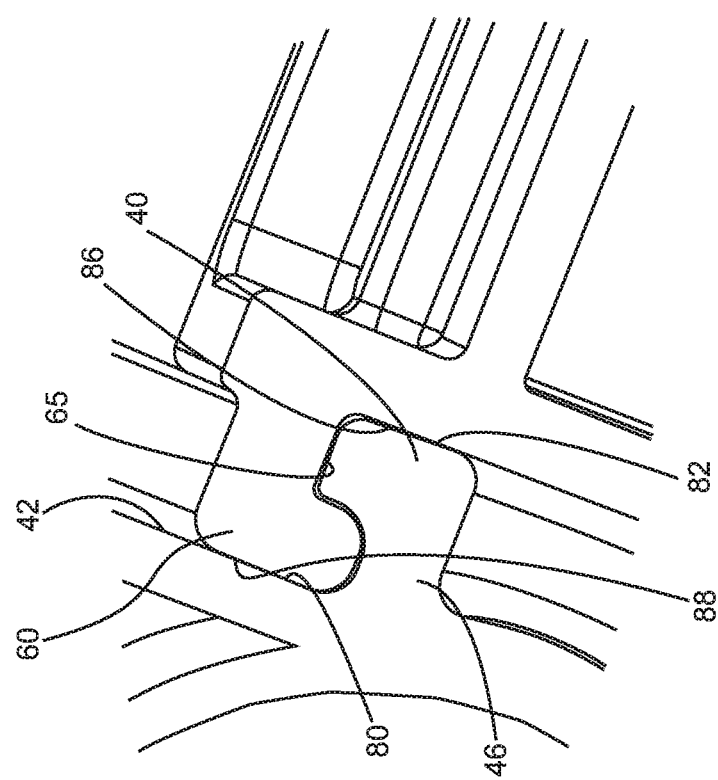
FIG. 3G is an enlargement of the portion marked 3G in FIG. 3C, illustrating the tolerance cancelation arrangement at the locked position.
Figure 4B:
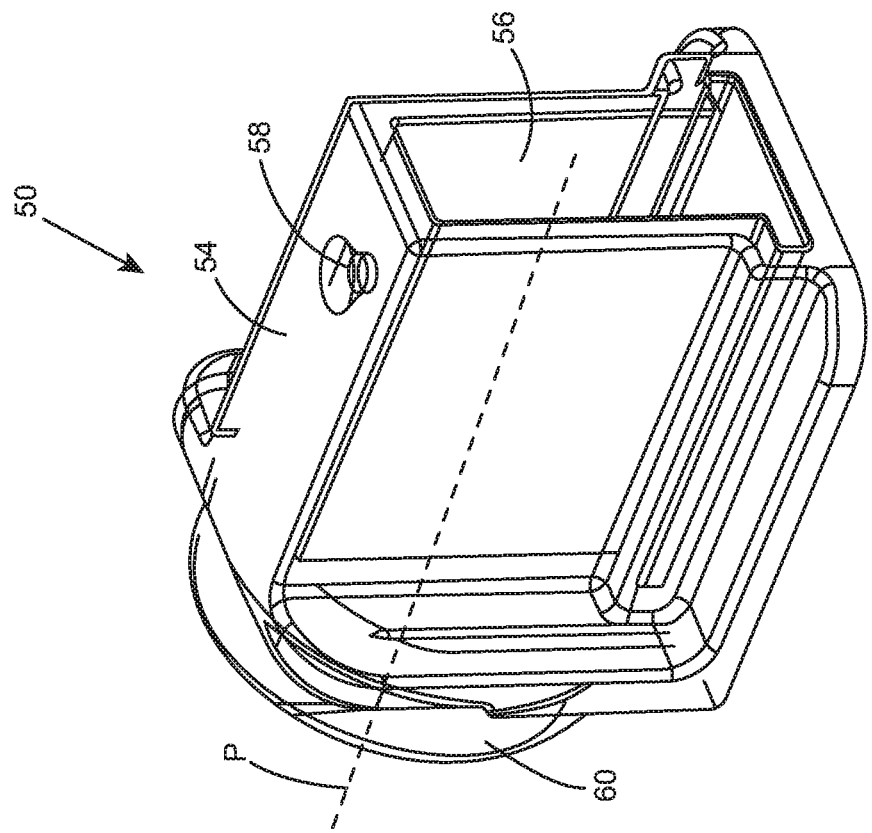
FIG. 4B is a rear perspective view of the socket coupler of FIG. 4A.
Figure 4A:
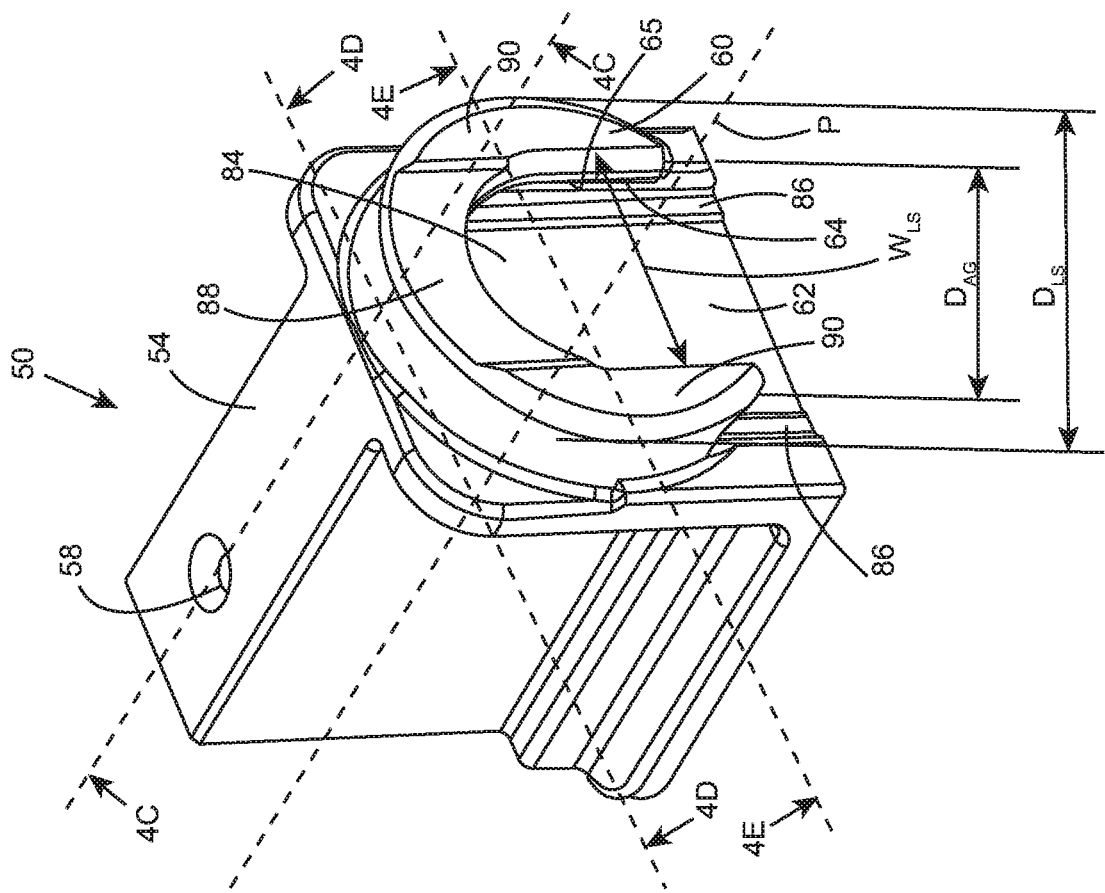
FIG. 4A is a front perspective view of a socket coupler of a coupling system according to the disclosure.

With further particular reference made also to FIGS. 3F and 3G, a tolerance cancelation arrangement is configured between the tab coupler 38 and the socket coupler 50 to thereby cancel or reduce to minimum tolerances therebetween. Referring first to the tab coupler 38 the tolerance cancellation arrangement comprises a first projection, namely elevated surface 80 from the locking face 42, said elevated surface 80 oriented along the Z axis and extending substantially parallel to the surface of locking face 42. A second projection, namely elevated surface 82 is configured at the front, head face of locking tab 40, said elevated surface 82 also oriented along the Z axis and extending substantially parallel to the surface of head face of locking tab 40.

Further reference is now made to socket coupler 50 wherein the mounting face 62 is configured with a central depressed portion 84 extending between two lateral elevated portions 86, wherein said depressed portion 84 and said lateral elevated portions 86 are oriented parallel to walls 65 of the tab arresting groove 64. The front, head face of the locking socket 60 is also configured with a depressed surface portion 88 between two elevated face surface 90 (FIG. 4A), oriented parallel to said central depressed portion 84 and two lateral elevated portions 86.

The width and projection of the first elevated surface 80 (the locking face 42 of tab coupler 38) corresponds with width and projection of the depressed surface portion 88 (head face of the locking socket 60) and the width and projection of the second elevated surface 82 (at the front, head face of locking tab 40) corresponds with width and projection of the central depressed surface portion 84 (at the mounting face 62 of locking socket 60). The orientation of the elevations/depressions 80, 82 of the tab coupler 38 are oriented at 90° with respect to the elevations/depressions 88, 90 of the locking socket 60, such that at the unlocked position they all extend coaxially (i.e. parallel to one another) and at the locked position they extend normal to one another, i.e. the tolerance cancellation arrangement takes place, as will be explained herein below.

Figure 12A:
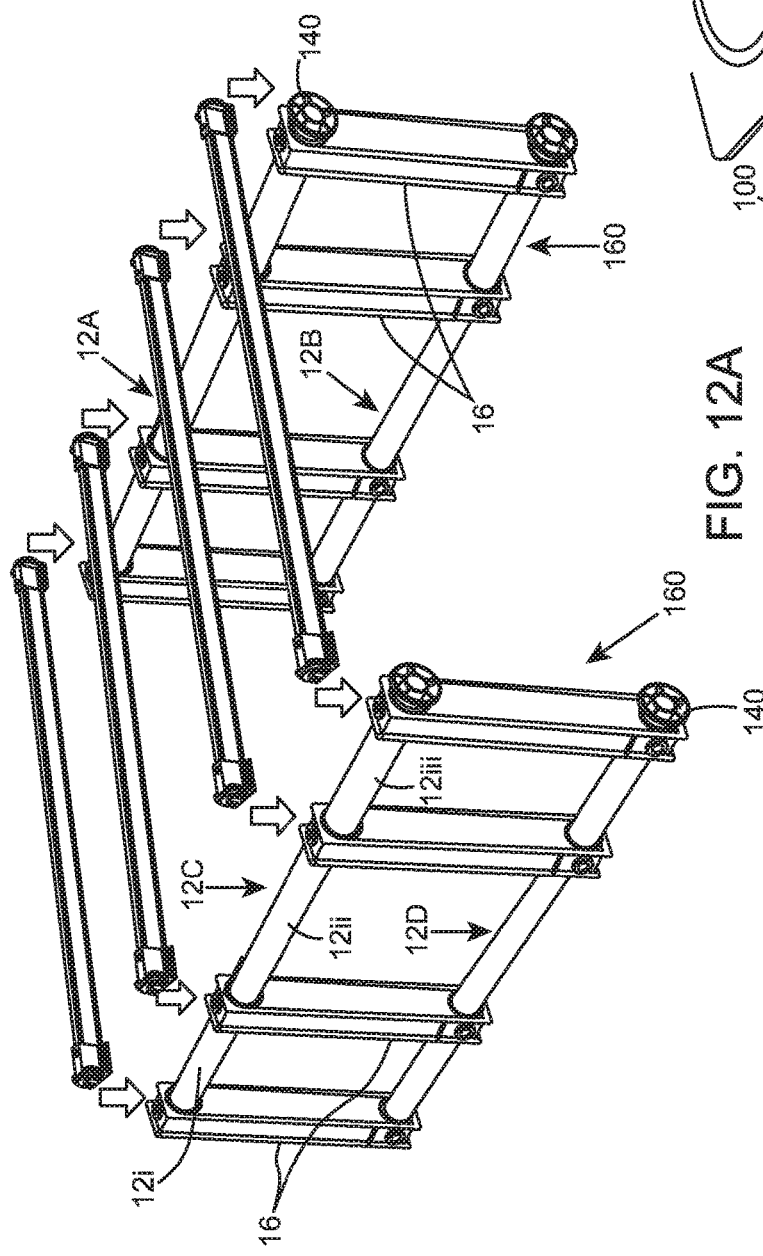
FIG. 12A illustrates a first step of articulating the assembled support beams to the side bars, into the unlocked position.
Figure 12B:
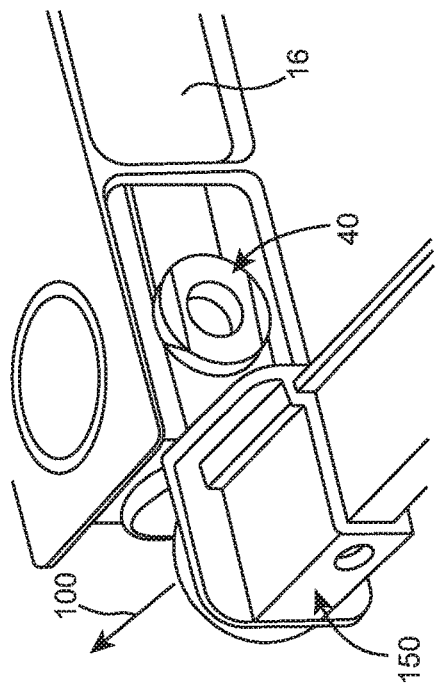
FIG. 12B is an enlarged view illustrating positioning the tab coupler and a socket coupler, into the unlocked position.

Locking engagement of the socket coupler 50 with the tab coupler 38 (regardless of what the construction is) takes place as follows: first, the socket coupler 50 is brought to the vicinity of the tab coupler 38 oriented such that the opening of the locking socket 60 faces the locking tab 40 (FIG. 12B). Then, the socket coupler 50 is displaced over the tab coupler 38, in direction of arrow 100 in FIG. 12B, such that slidingly surfaces 84 and 88 of the socket coupler 50 slide over surfaces 80 and 82, respectively, of the tab coupler 38. Once fully introduced, i.e. when the arresting groove 64 of the socket coupler 50 encounters the neck portion 46 of the tab coupler 38 (this position is depicted in FIGS. 6A to 6F) the P axis of the socket coupler 50 coincides with the Y axis of the tab coupler 38 and then the socket coupler 50 is rotated at 90° about the P axis (in direction of arrow 102 in FIGS. 12C and 12D) into the locked position. At the locked position the socket coupler 50 can not detach from the tab coupler 38, unless rotated in a counter direction of arrow 102, into the unlocked position. As mentioned above, at the unlocked position the tolerance cancelation projections of the tab coupler and of the socket coupler are coaxially oriented and do not interlace with one another, and at the locked position the tolerance cancellation projections bear against one another so as to apply axial pressure between the tab coupler and the socket coupler (along the coaxial axes P and Y).

Figure 11B:
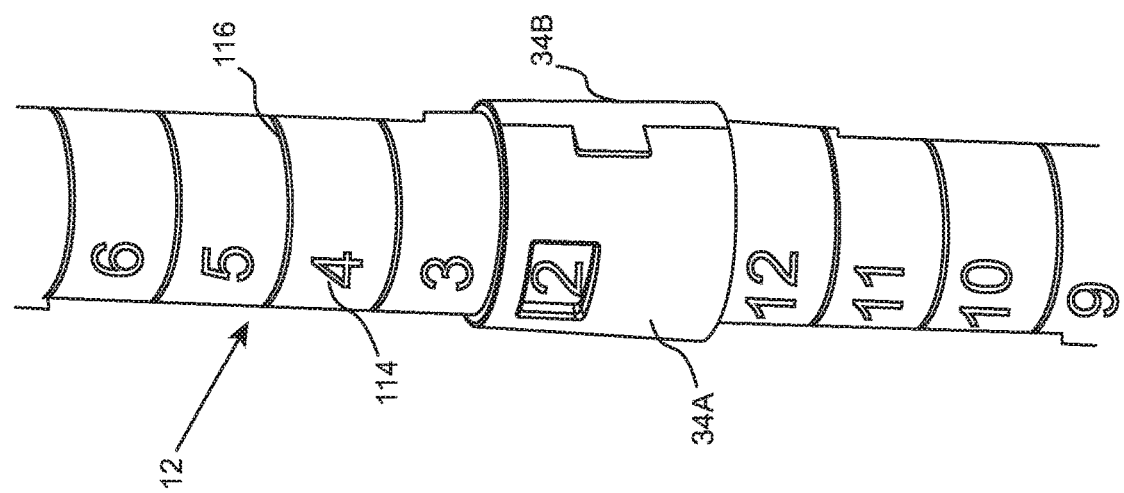
FIG. 11B illustrates fitting a mounting shim on the support post of FIG. 11A.
Figure 11A:
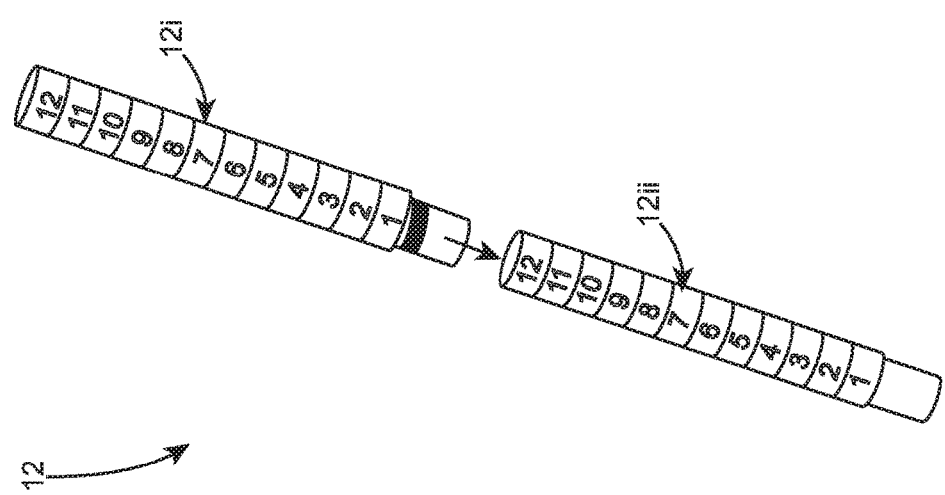
FIG. 11A illustrates assembling two support posts.

Further attention is now made to FIGS. 7A to 7E, directed to a post mounting assembly generally designate 110. As seen, the support post 12 is composed of several (identical) cylindrical tubular segments 12i, 12ii, etc., screw coupled to one another, as seen for example in FIG. 11A. The support post 12 is configured with indicia 114 in the form of numbers representing axial increments along the support post 12. The support post 12 is further configured with a plurality of equally spaced annular grooves 116.

A pair of shims 34A and 34B is provided, said shims 34 being identical though inverted (up-side down) and each having a cylindrical portion inside surface 120 and a tapering outside face 122, with one or more (three in the illustrated example) radial projections 126. Each of the shims 34A and 34B comprises a cut out portion 128 and a complimentary projecting tab 132, said tap configured for snap arresting within the cut out portion 128 so that the two shims 34A and 34B engage to become a cylindrical sleeve like element. The shims 34A and 34B are further configured with a window 134 facilitating viewing the indicia 114 marked on the surface of the support post 12.

Upon assembly, the shims 34A and 34B are placed over the support post 12 at an embracing position (FIG. 7D), at a desired elevation (this can be easily appreciated through the visualizing aperture 134), whereupon the side bar 16 is placed over the adjoining shims such that the inside tapering surface of bore 30 embrace the shims over the support post 12 and whereby the side bar 16 can displace thereover until the inclined surfaces (that of the inside bore 30 and that of the outside surface 122 of the shims) coincide, whereby the side bar 16 is axially arrested and will not further displace along the support post 12, unless lifted from the shims 34.

FIGS. 8A and 8B are directed to a ground piece 140 articulated to a bottom most pole support segment 12iii of the shelving system 10, wherein the ground piece 140 comprises a floor engaging portion 142 and an internally threaded neck portion 144 configured for screw coupling at a bottom of the pole support segment 12iii. The ground piece 140 can be thread coupled all the way trough or part way only, so as to regulate the height of the support post, e.g. over an uneven surface.

Although not shown, it is appreciated that a sealing support piece can be articulated by screw coupling at a top end of an upper most support post segment, to thereby axially bear against a ceiling surface.

Figures 9A, 9B:
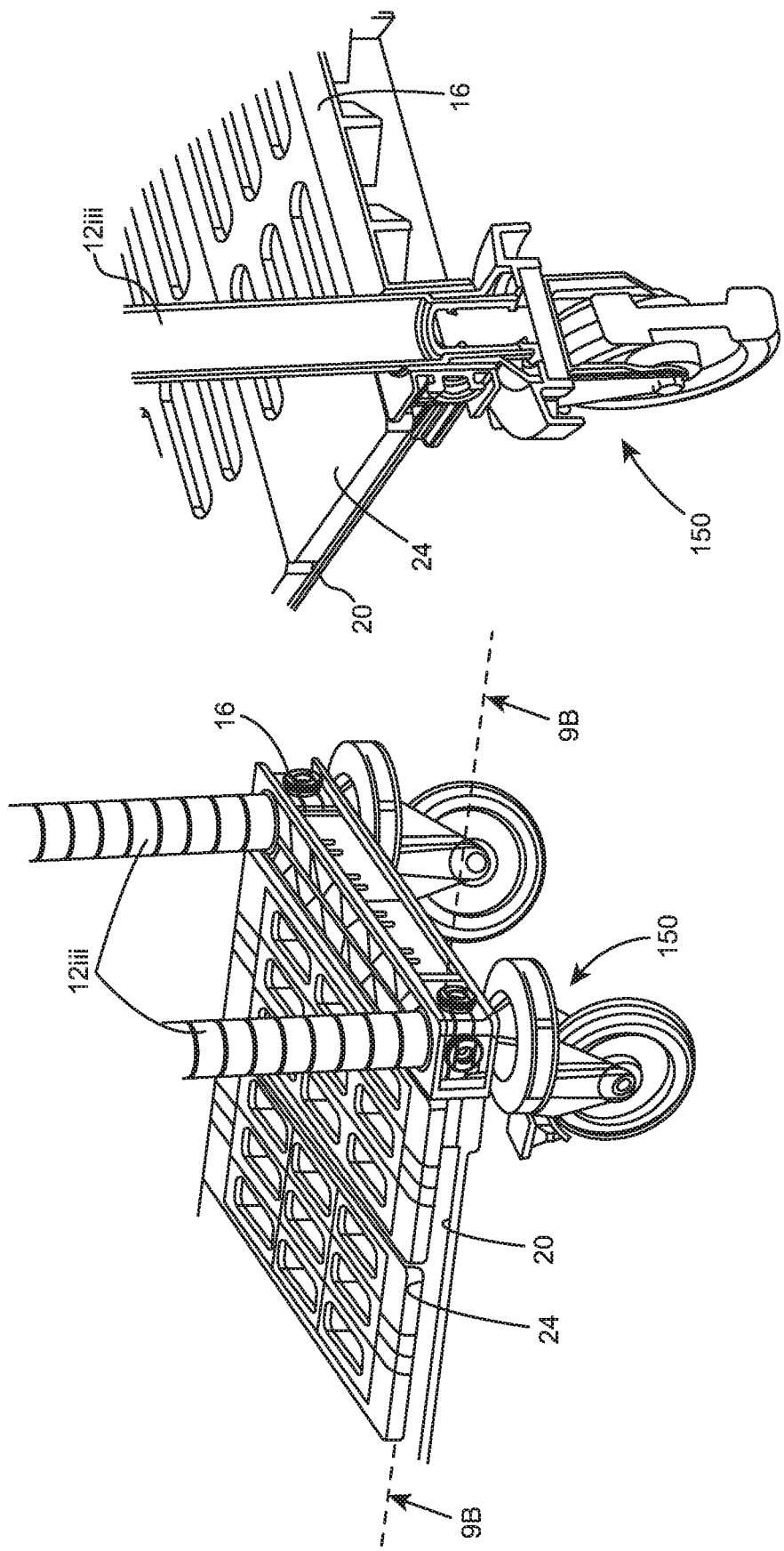
FIG. 9A is similar to FIG. 8A however illustrating a wheeling system of the shelving system.
FIG. 9B is a vertical section along line 9B-9B in FIG. 9A.

FIGS. 9A and 9B illustrate a swivel wheel 150 articulated to the bottom most pole support segment 12iii of the shelving system 10, in a similar fashion as ground piece 140 discussed hereinabove, whereby the shelving system 10 (or any construction assembly) can be easily wheeled over a surface.

Further attention is now directed to FIGS. 10 to 14 for explaining how a construction assembly, e.g. a shelving system 10, according to the present disclosure is assembled.

In FIGS. 10A to 10D there is shown a support beam 20, of generally rectangle cross-section, made for example of extruded metal, is fitted at its respective ends into receptacle 56 of a socket coupler 50 and secured in place by a screw inserted through fastener bore 58, obtaining a support beam sub-assembly 158.

Then, all support posts 12A-12D are assembled by screw coupling the support posts segments to one another (FIG. 11A) and the shims 34A and 34B are placed over the respective support post at the desired elevation (FIG. 11B) allowing the respective side bars 16 to be fixed at the desired location, as explained hereinabove with reference to FIGS. 7A to 7E, and the ground piece 140 are fitted too, obtaining two ladder-like sub-assemblies 160 (FIG. 12A).

Figures 12C, 12D:
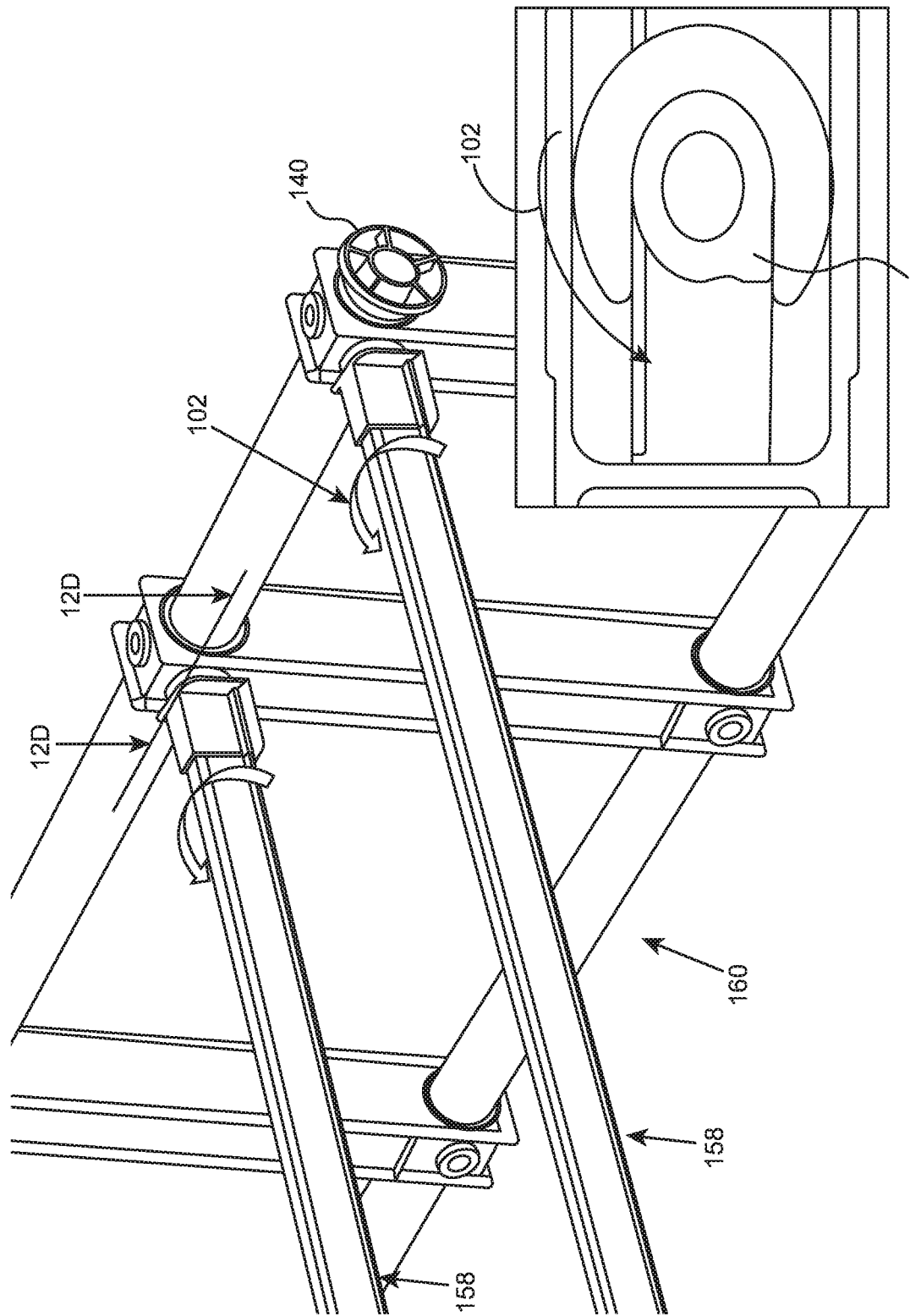
FIG. 12C is a second step of engaging the tab coupler and a socket coupler, namely at the unlocked position.
FIG. 12D is an enlarged sectioned view along line 12D-12D in FIG. 12C, at the unlocked position.
Figure 13B:
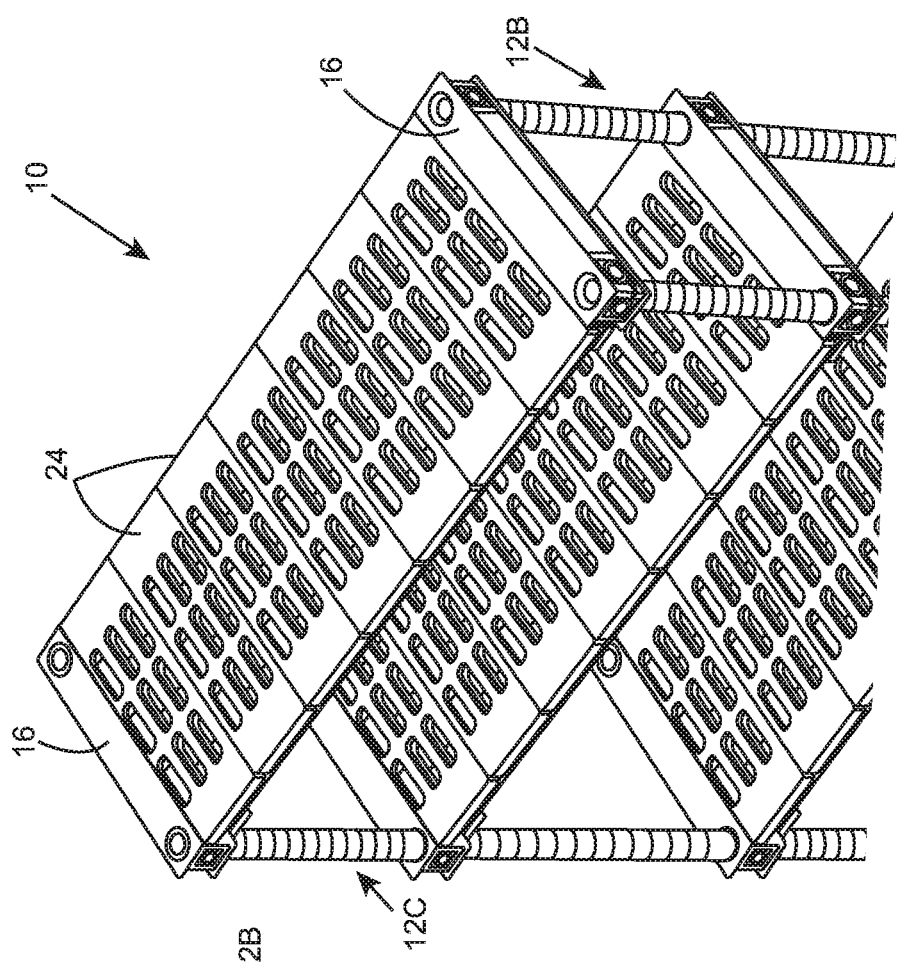
FIG. 13B illustrates the assembled shelving system, with shelves.
Figure 13A:
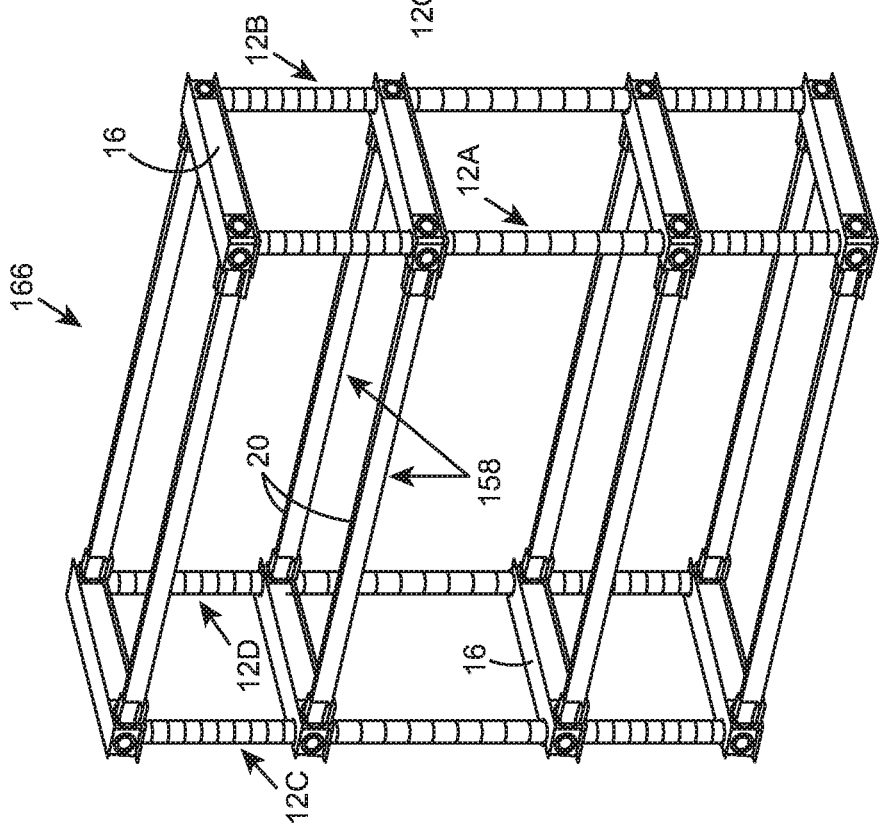
FIG. 13A illustrates an assembled shelving system, without shelves.

Further, the support beam sub-assemblies are 158 (FIG. 10A) placed in proximity with the ladder-like sub-assemblies 160 (FIGS. 12A and 12B) and then the support beam sub-assemblies 158 are slidingly displaced into the unlocked position of the socket couplers 50 with respect to the tab couplers 38 of the side beams 16 (as explained in connection with FIGS. 6A-6F above) and as illustrated in FIGS. 12C and 12D. rotating the support beam sub-assemblies 158 in direction of arrow 102 (FIGS. 12C and 12D) entails locking engagement of the socket couplers 50 with the tab couplers 38 as explained hereinabove, whereby a shelving construction assembly 166 is configured (FIG. 13A).

Figure 14B:
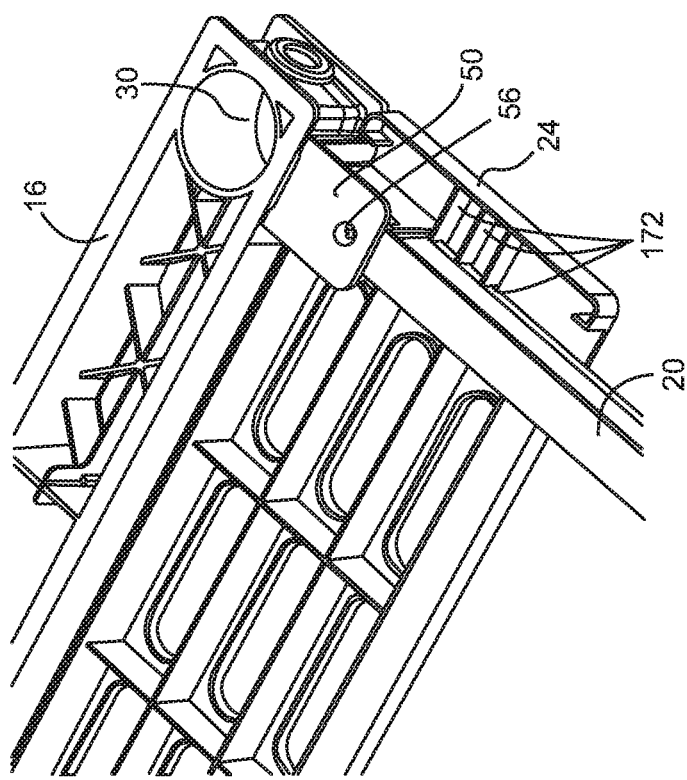
FIG. 14B a bottom view of a portion of a support beam and a shelve.
Figure 14A:
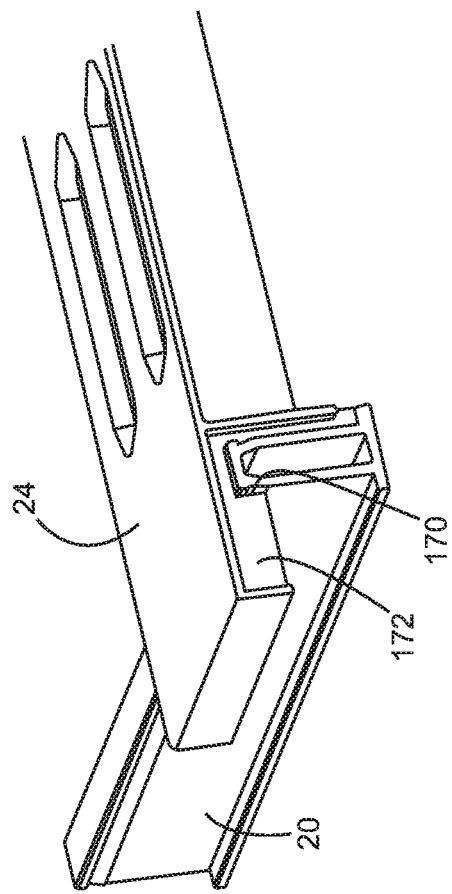
FIG. 14A is a top sectioned view of a portion of a support beam and a shelve.
Figure 16A:
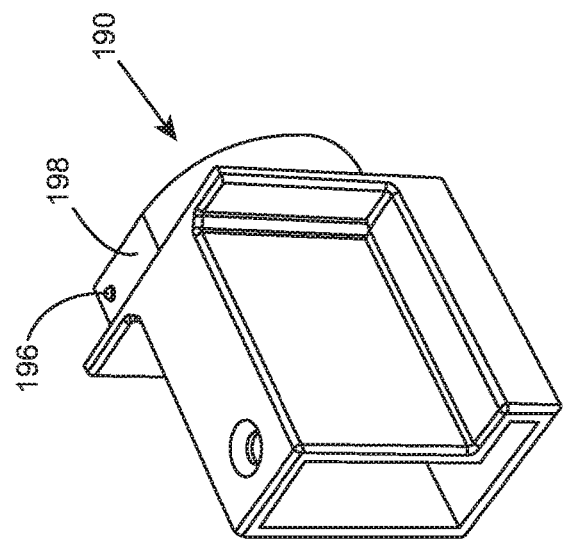
FIGS. 16A and 16B are a perspective front view and a perspective rear view, respectively, of a locking socket fitted with a securing arrangement.
Figure 16B:
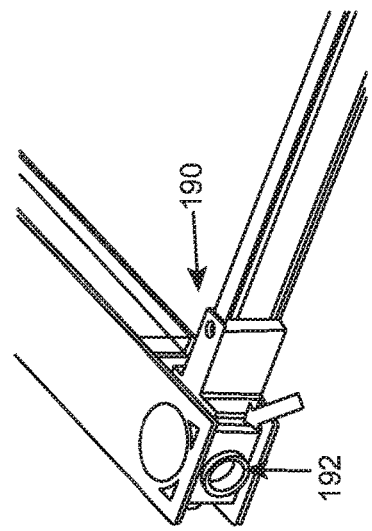
Figure 16C:
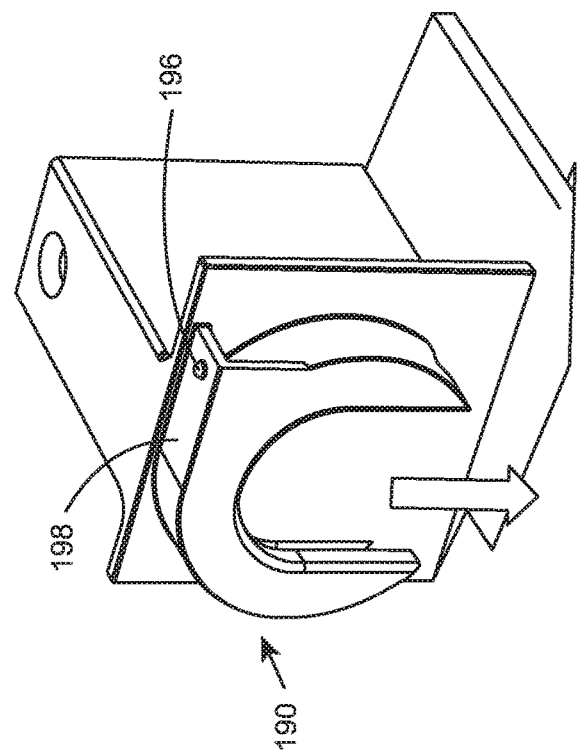
FIGS. 16C and 16D illustrate how a locking socket of FIGS. 16A and 16B interlocks with a tab coupler fitted with a securing arrangement.
Figure 16D:
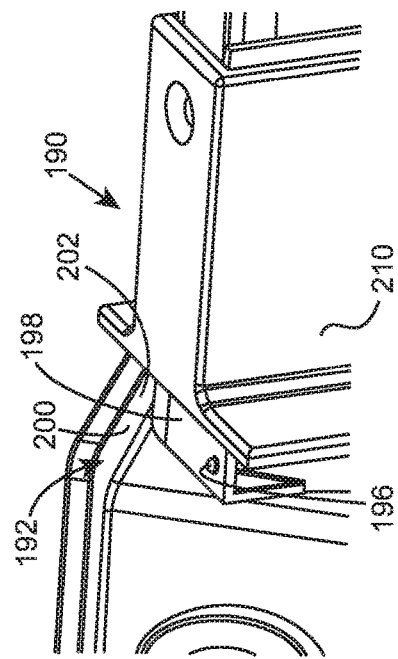

Finally, the shelving tiles 24 are placed over the leveled support beams 20 (FIGS. 14A and 14B). Fixing the shelving tiles 24 over the support beans can be facilitated by a groove 170 configured along a bottom face of side portions of the shelving tiles 24, wherein said groove can be continuous (not shown) or comprise several co-extensive ribs 172 each with a cutout shaped for snugly and snappingly mounting over the T-like shaped top portion of the support beams 20.

FIG. 15 illustrates a square tab mounting unit generally designated 180, configured with a central tapering bore 182, fitted for mounting on a support post (not shown) in a similar fashion as discussed herein before with reference to side bars 16. The tab mounting unit 180 comprising four tab couplers 184 (only three of which are seen) and a perimetric barrier wall 186, similar to the disclosure of tab couplers 36 mentioned before, and wherein coupling thereto a socket coupler (not shown) takes place in a similar fashion as discussed. For example, four such a square tab mounting units 180 can replace two side bars 16 of the previous example.

With reference to FIGS. 16A to 17D there is illustrated a socket coupler generally designated 190 for use in conjunction with a tab coupler 192, both being similar to the respective socket coupler 50 and tab coupler 38 discussed before, however with a securing arrangement comprising a bulge 196 projecting from a top, flat locking surface 198 of the socket coupler 190, and configured for snappingly arresting within a depression 200 configured at a bottom face of arresting wall 202 of the tab socket 192. The arrangement is such that once rotated into the locked position (arrow 210 in FIG. 16C) the locking surface 198 snugly bears against arresting wall 202 and the bulge 196 snappingly arrests within depression 200, whereby the socket coupler 190 is prevented from rotating beyond 90° and the two elements are arrested at the locked position to prevent spontaneous unlocking.

FIGS. 17A to 17E illustrate a construction system, namely an L-like shaped shelving system generally designated 220, wherein principal elements are identical with those illustrated and described with reference to pervious figures. The shelving system 220 comprises two co-extending shelve sections 222 and 224 and a third section 226 articulated at a right angle to the shelve section 224, as will be discussed.

Figure 17A:
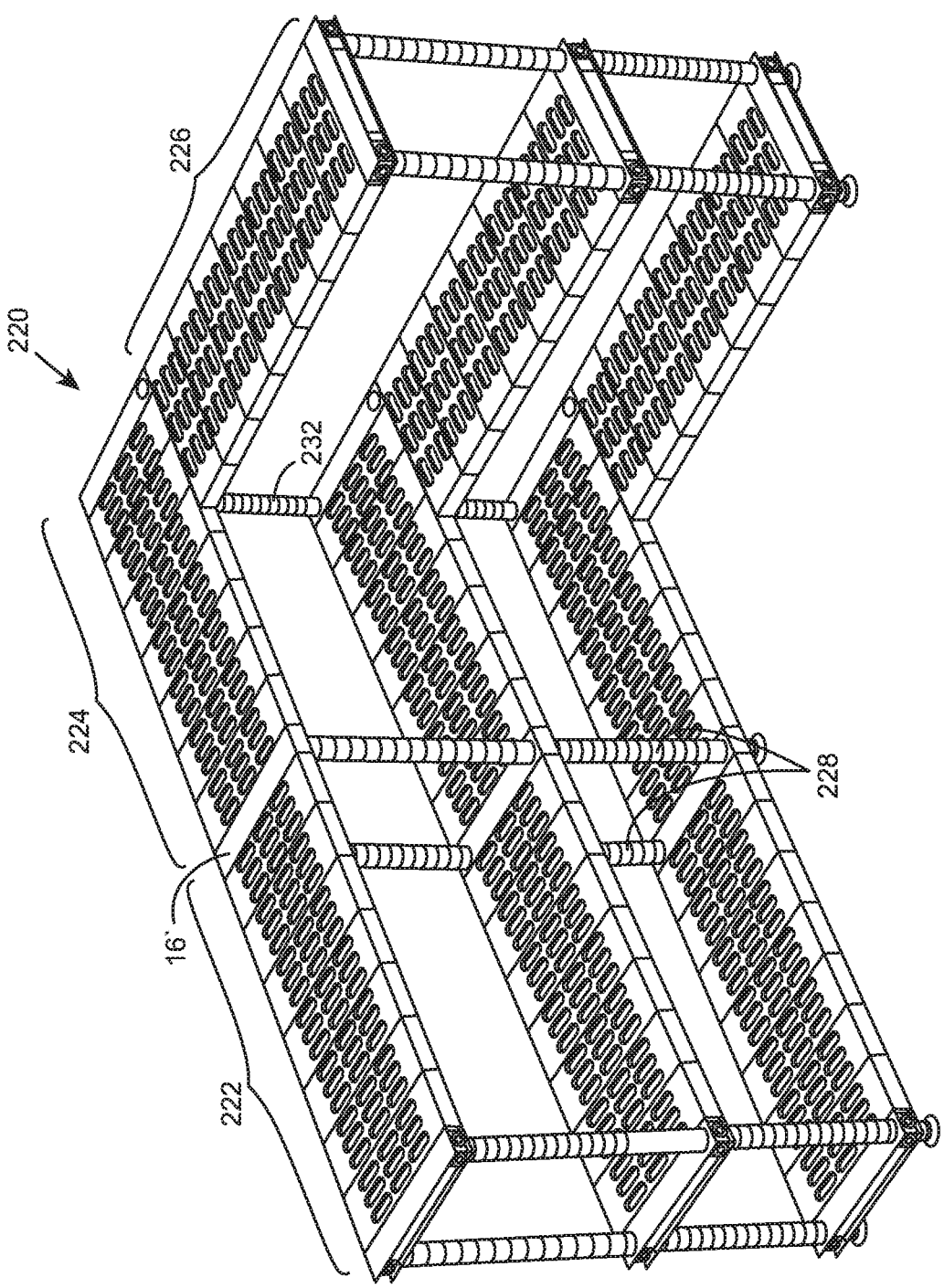
FIG. 17A illustrates an L-shaped shelving system comprising coupling elements according to different examples of the present disclosure.
Figure 17E:
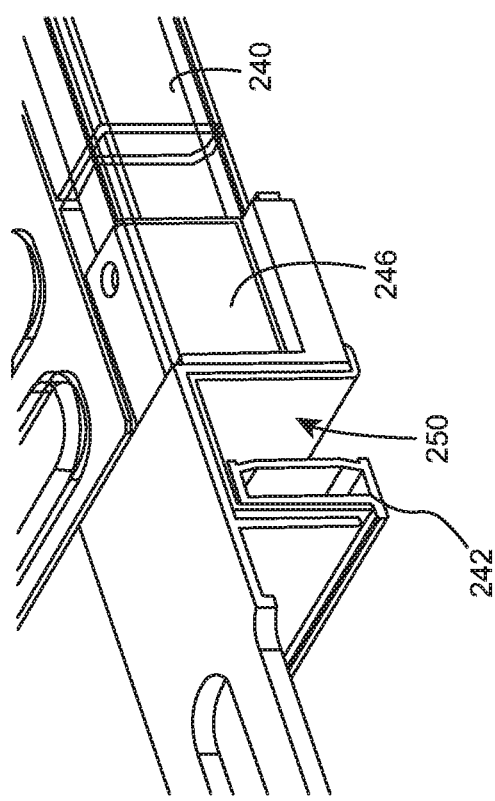
FIG. 17E is a sectioned view in direction of arrow 17E in FIG. 17D.
Figure 17D:
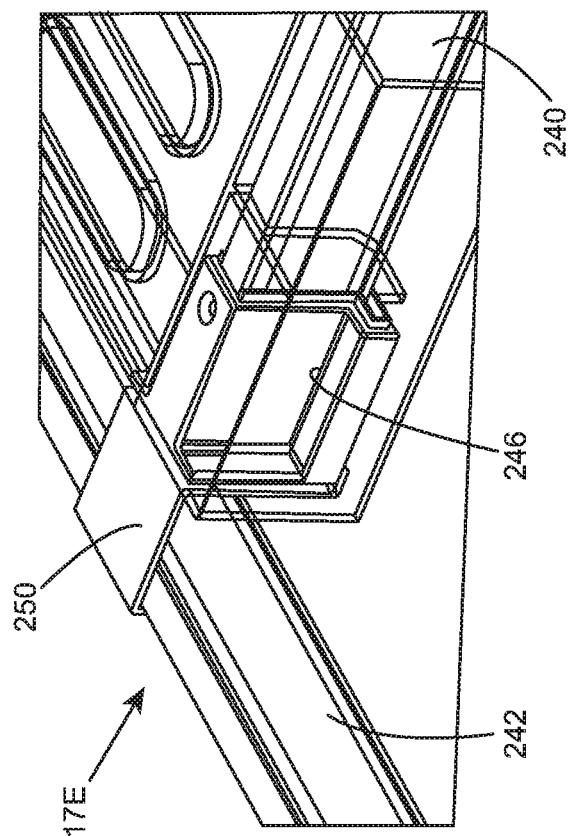
FIG. 17D is an enlargement of the portion marked 17D in FIG. 17B.

Shelve sections 222 and 224 share a common set of support posts 228, wherein central side bars 16' (identical with side bar 16 discussed hereinabove) facilitates for coupling a socket coupler at each side thereof, along the Y axis. In FIG. 17A the shelve section 224 is supported at its right side by only one support post 232 at a rear right side thereof, though it is appreciated that a front right side support post can be configured as well.

Shelve section 226 is articulated to shelve section 224 by coupling a socket coupler 232 of support beam 234 to a front-facing tab coupler 238 of side bar 16" (i.e. tab coupler disposed along the Z axis) similarly as discussed hereinabove. The front support beam 240 is articulated to the support beam 242 of shelve section 224 by socket coupler 246 (fixed at the end of support beam 240) which in turn is coupled to a tab mounting unit 250 in the form of a solid sheet element bent to embrace the support bar 242 and configured with a tab coupler (not seen) to which the socket coupler 246 is coupled.

The system is modular and versatile. For example, if required, an additional shelve (or any other construction element) can be articulated to the front tab coupler 252 of central side bar 16' (FIG. 17C).

The invention claimed is:

1. A shelving system comprising:
 a plurality of support posts;
 at least one tab coupler mounted on each support post such that each tab coupler faces at least one equileveled tab coupler mounted on a neighboring support post; and
 a plurality of socket couplers each fitted at respective opposite ends of support beams, said tab coupler comprising at least one locking tab extending from a locking face along a locking axis and configured with a round T-like sectioned shape, said socket coupler comprising at least one U-shaped locking socket projecting from a mounting face of the socket coupler along a coupler axis and configured with a U-shaped tab arresting groove;
 the shelving system is configurable between an unlocked position whereat the locking socket slidingly receives the locking tab so that the locking axis and the coupler axis coincide, and a locked position upon rotating one of the tab coupler and the socket coupler about the coinciding axes, entailing snugly arresting of the locking tab by the locking socket, preventing sliding displacement and axial displacement along the coinciding axes and defining a support surface on the support beams.

2. The shelving system of claim 1, wherein a neck of the locking tab and a head of the locking tab are cylindrical, and a locking socket head and the tab arresting grove have a U-like shape, thereby facilitating sliding displacement of the socket coupler into engagement with the tab coupler, into the unlocked position, and wherein rotation of the socket coupler or the tab coupler entails engagement therebetween at the locked position.

3. The shelving system of claim 1, wherein the tab coupler and the socket coupler are each integrally articulated with, or articulable integrated, with a respective first construction member and a second construction member.

4. The shelving system of claim 1, wherein the tab coupler further comprises at least one barrier member spaced from the locking tab, wherein the socket coupler is slidably detachable from the tab coupler only at the unlocked position, along a path of displacement.

5. The shelving system of claim 4, wherein the at least one barrier member is disposed so as to prevent sliding displacement of the socket coupler in a direction perpendicular to a path of displacement of the socket coupler with respect to the tab coupler.

6. The shelving system of claim 4, wherein the at least one barrier member is a wall portion extending parallel to the path of displacement.

7. The shelving system of claim 1, wherein at the unlocked position an opening of the tab arresting groove faces in a direction of the path of displacement.

8. The shelving system of claim 1, wherein a foolproof guard is provided at the tab coupler, configured for prevention rotation of the socket coupler beyond the locked position.

9. The shelving system of claim 8, wherein the foolproof guard can extend at a $4^{th}$ quadrant of the round neck of the locking tab.

10. The shelving system of claim 8, wherein the foolproof guard is configured as a tangential extension of the neck of the locking tab, said extension extending at either or both tangents at the $4^{th}$ quadrant.

11. The shelving system of claim 1, wherein at least one tab coupler extends from a tab mounting unit, said tab mounting unit intercoupling the at least one tab coupler with any support unit.

12. The shelving system of claim 11, wherein the tab mounting unit is a side bar of the shelving system, and wherein the plurality of support posts comprises at least two right support posts and at least two left support posts, each of the right support posts and the left support posts interconnect with one another through a side bar, wherein said side bar is configured with at least one tab coupler, said at least one tab coupler disposed on a side face of the side bar and facing a tab coupler of the other of the right support posts and the left support posts.

13. The shelving system of claim 12, wherein the side bar is configured with at least one secondary tab coupler, said secondary tab coupler disposed at a front face or rear face of the side bar.

14. The shelving system of claim 11, wherein each end of the side bar is configured with a right side tab coupler, a front or rear side tab coupler, and a left side tab coupler.

15. The shelving system of claim 11, wherein the tab mounting unit is articulable to any support structure.

16. The shelving system of claim 11, wherein the tab mounting unit is a prismatic body configured with at least one tab coupler over at least one face of the prismatic body.

17. The shelving system of claim 11, wherein the tab mounting unit is configured for mounting over a support post, said tab mounting unit comprising one or more radially disposed tab couplers.

18. The shelving system of claim 11, wherein the tab mounting unit comprises several tab couplers, for articulating respective socket couplers thereto, at a coextensive configuration, at an angled configuration, or at coextensive and angled configurations.

19. The shelving system of claim 1, wherein a tolerance cancelation arrangement is configured between the tab coupler and the socket coupler, to thereby cancel or reduce to minimum tolerances therebetween.

20. The shelving system of claim 19, wherein the tolerance cancelation arrangement comprises one or more socket tolerance projections configured at one of the mounting face and a head face of the socket coupler, and the locking face and a head face of the locking tab; and a complimentary one or more tab tolerance projections configured at the other one of the mounting face and the head face of the socket coupler, and the locking face and the head face of the locking tab; wherein at the unlocked position said socket tolerance projections and said tab tolerance projections are coaxially oriented and do not interlace with one another, and at the locked position, said socket tolerance projections and said tab tolerance projections bear against one another so as to apply axial pressure between the tab coupler and the socket coupler.

21. The shelving system of claim 20, wherein the socket tolerance projections project from the mounting face and the head face of the socket coupler substantially the same extent as the tab tolerance projections projects from the locking face and the head face of the locking tab, whereby at the unlocked position, they zero each other, and at the locked position their axial projection accumulates to apply the axial pressure between the tab coupler and the socket coupler.

22. The shelving system of claim 20, wherein the socket tolerance projections and the tab tolerance projections are co-oriented at the unlocked position, and intersect one another at the locked position.

23. The shelving system of claim 1, wherein a securing arrangement is configured at one or both of the tab coupler and the socket coupler, for preventing spontaneous displacement from the locked position into the unlocked position.

24. The shelving system of claim 23, wherein the securing arrangement is a projection configured at one of the tab coupler and the socket coupler, and a depression configured at the other one of the tab coupler and the socket coupler, wherein said projection is snappingly engageable by the depression.

25. The shelving system of claim 1 comprising one or more utility modules applicable over the support beams.

26. The shelving system of claim 25, wherein a post mounting assembly is configured for detachably axially articulating a tab mounting unit over one of the plurality of support posts, said post mounting assembly comprising a post configured with at least one radial post engaging member, and a mounting shim comprising at least one shell member having an inside, concave surface corresponding with an external surface of the support post, and fitted at the concave surface with at least one radial shim engaging member configured for snug engagement with a corresponding radial post engaging member, and wherein an outside convex surface of the mounting shim has an arresting mechanism configured for engaging within a bore of the tab mounting unit.

27. The shelving system of claim 26, wherein the mounting shim of the post mounting assembly comprises a single shell member configured for snug engagement over the support post, the single shell member spanning approximately 180°.

28. The shelving system of claim 26, wherein the mounting shim of the post mounting assembly comprises two or more shell members configured for snug engagement over the support post.

29. The shelving system of claim 26, wherein the two or more shims of the post mounting assembly interconnect with one another.

30. The shelving system of claim 26, wherein an outside surface of the mounting shim is configured with a tapering surface facilitating as an arresting mechanism for engaging within a correspondingly tapering cross section of within the bore of the tab mounting unit.

31. The shelving system of claim 26, wherein the radial shim engaging member of the at least one shim member comprises one or more radial ribs or radial grooves, configured for engaging with corresponding other of radial ribs or radial grooves configured at the external surface of the support post.

* * * * *